(12) United States Patent
Jenkins

(10) Patent No.: US 10,495,071 B1
(45) Date of Patent: Dec. 3, 2019

(54) ROTATIONAL GRAVITATIONAL TORQUE-GENERATING SYSTEM AND METHOD

(71) Applicant: Robert E. Jenkins, Winter Haven, FL (US)

(72) Inventor: Robert E. Jenkins, Winter Haven, FL (US)

(*) Notice: Subject to any disclaimer, the term of this patent is extended or adjusted under 35 U.S.C. 154(b) by 0 days.

(21) Appl. No.: 16/287,885

(22) Filed: Feb. 27, 2019

Related U.S. Application Data

(63) Continuation-in-part of application No. 15/973,007, filed on May 7, 2018, now abandoned, which is a continuation of application No. 14/843,641, filed on Sep. 2, 2015, now abandoned.

(60) Provisional application No. 62/089,701, filed on Dec. 9, 2014.

(51) Int. Cl.
*F03G 3/00* (2006.01)

(52) U.S. Cl.
CPC ...................... *F03G 3/00* (2013.01)

(58) Field of Classification Search
CPC ...................... F03G 3/00; F03G 7/10
See application file for complete search history.

(56) References Cited

U.S. PATENT DOCUMENTS

| | | | | |
|---|---|---|---|---|
| 2006/0060013 A1* | 3/2006 | Robinson | ............... | B64C 39/00 74/84 S |
| 2007/0012124 A1* | 1/2007 | Perez | ............... | F03G 3/00 74/84 S |
| 2009/0174121 A1* | 7/2009 | Hayes | ............... | B29C 45/1671 264/447 |
| 2012/0299308 A1* | 11/2012 | Kondo | ............... | F03G 3/00 290/1 C |
| 2015/0260168 A1* | 9/2015 | Geneste | ............... | F03G 3/00 60/517 |

FOREIGN PATENT DOCUMENTS

| | | | | |
|---|---|---|---|---|
| DE | 10045988 A1 | * | 5/2002 | ............... F03G 3/00 |
| KR | 2016116654 A | * | 10/2016 | ............... F03G 3/00 |
| WO | WO-2016151406 A2 | * | 9/2016 | ............... F03G 3/00 |

* cited by examiner

*Primary Examiner* — Phillip A Johnson
(74) *Attorney, Agent, or Firm* — John Rizvi; John Rizvi, P.A.—The Patent Professor®

(57) ABSTRACT

A rotational gravitational machine including a rotatable structure and a set of movable weight assemblies carried by the rotatable structure and jointly rotatable with the rotatable structure about a rotation axis. The movable weight assemblies are arranged radially spaced apart from the rotation axis and angularly spaced apart from each other. Each movable weight assembly includes a movable magnetic weight that can reciprocally and radially move between radially innermost and outermost positions relative to the rotation axis. A first magnetic biasing system is provided, including a radially movable, first magnetic piston which magnetically biases the movable magnetic weight between the radially innermost position and the radially outermost position in order to unbalance the assembly formed by the rotatable structure and movable weight assemblies. This unbalancing allows gravity to produce a torque arm that promotes rotation of the assembly about the rotation axis.

20 Claims, 11 Drawing Sheets

US 10,495,071 B1

ROTATIONAL GRAVITATIONAL TORQUE-GENERATING SYSTEM AND METHOD

CROSS-REFERENCE TO RELATED APPLICATION

This application is a Continuation-in-Part of U.S. patent application Ser. No. 15/973,007, filed on May 7, 2018, which is a Continuation of U.S. patent application Ser. No. 14/843,641, filed on Sep. 2, 2015, which in turn claims the benefit of U.S. Provisional Patent Application Ser. No. 62/089,701, filed on Dec. 9, 2014, all of which are incorporated herein in their entirety.

FIELD OF THE INVENTION

The present invention relates generally to rotational gravitational machines and methods and, more particularly, to a rotational gravitational machine and method featuring a rotatable structure provided with radially moving pairs of magnetic weights, wherein rotation of the rotatable structure can cause the turning of a shaft, whose rotation can be used for producing electrical energy.

BACKGROUND OF THE INVENTION

It is important in today's society to provide a clean and safe source of energy in the form of electrical power. Additionally, an increasing number of third world countries are developing industries in areas where a traditional power grid is inaccessible or impractical. Current power systems include nuclear, coal fired or wind powered plants. In more remote or sunny areas, solar power is used to provide a local source of electrical energy alternatively to or remote from power grids.

Nuclear power plants are very large scale operations that produce toxic materials, are very costly to construct, operate and maintain and are generally unsuitable for remote areas. This is especially true where there is no source of fluids to cool the facility. Coal fired power plants may be smaller but also are a source of toxic materials and produce by products such as mercury. They require a relatively close source of coal to be cost efficient. Both systems require a constant input of fuel to operate.

Wind turbines are controversial in that they require a large number of individual machines to be practical and they dominate and obscure the landscape and its vistas. In addition, they obviously only work best in areas of a steady and sufficient wind flow and are unreliable at best in areas of varying wind conditions.

Finally, solar panels suffer similar limitations as they are unsightly when used on a large scale and require a steady and strong solar presence to produce power. Obviously, they only operate during daylight hours limiting their usefulness to developing countries.

Accordingly, there is an established need for a system and method for producing energy with a minimal input of resources. There is also a need for a system and method of producing energy in remote locations using locally available materials.

SUMMARY OF THE INVENTION

The present invention is directed to a rotational gravitational device, system, apparatus or machine, hereinafter referred to generically as rotational gravitational machine, for providing an output torque to a shaft for powering an external electrical generator or other rotational power consuming device. The rotational gravitational machine generally includes a rotatable structure configured to rotate about a rotation axis, and a plurality of movable weight assemblies carried by and jointly rotatable with the rotatable structure about the rotation axis. The movable weight assemblies are arranged radially spaced apart from the rotation axis and angularly spaced apart from each other. Each movable weight assembly includes a movable magnetic weight configured for reciprocal radial translation between a radially innermost position relative to the rotation axis and a radially outermost position relative to the rotation axis. A first magnetic biasing system is provided, including a radially movable, first magnetic piston configured to bias the movable magnetic weight between the radially innermost position and the radially outermost position in order to unbalance the assembly formed by the rotatable structure and movable weight assemblies such that, by gravity, a torque arm is produced that promotes rotation of the assembly about the rotation axis.

Introducing a first implementation of the invention, the present invention consists of a rotational gravitational machine comprising:
  a rotatable structure, configured to rotate about a rotation axis;
  a plurality of movable weight assemblies carried by and jointly rotatable with the rotatable structure about the rotation axis, wherein the movable weight assemblies are arranged radially spaced apart from the rotation axis and angularly spaced apart from each other, wherein each movable weight assembly comprises a movable magnetic weight configured for reciprocal radial translation between a radially innermost position relative to the rotation axis and a radially outermost position relative to the rotation axis; and
  a first magnetic biasing system including a radially movable, first magnetic piston configured to bias the movable magnetic weight between the radially innermost position and the radially outermost position.

In a second aspect, the first magnetic biasing system can further include a first electric motor configured to radially move the first magnetic piston.

In another aspect, the rotational gravitational machine may further include at least one proximity switch configured to detect the presence of one weight assembly of the plurality of weight assemblies and responsively supply power to the first magnetic biasing system to bias the movable magnetic weight between the radially innermost position and the radially outermost position.

In another aspect, the rotational gravitational machine can further comprise a second magnetic biasing system including a radially movable, second magnetic piston configured to bias the movable magnetic weight between the radially outermost position and the radially innermost position.

In another aspect, the second magnetic biasing system can include a second electric motor configured to radially move the second magnetic piston.

In another aspect, the rotational gravitational machine can further include at least one proximity switch configured to detect the presence of one weight assembly of the plurality of weight assemblies and responsively supply power to the second magnetic biasing system to bias the movable magnetic weight between the radially innermost position and the radially outermost position.

In another aspect, the rotatable structure may include an arm array including a plurality of arm assemblies extending radially outward of the rotation axis and angularly spaced-apart with one another. Each movable weight assembly of the plurality of movable weight assemblies can be carried by a respective arm assembly of the plurality of arm assemblies.

In another aspect, the rotational gravitational machine can additionally include a central hub assembly defining the central rotation axis. The arm assemblies may extend radially outward of the central hub.

In another aspect, the plurality of movable weight assemblies can be rotatable through a top dead center position and a bottom dead center position. The first magnetic biasing system may be located adjacent to the top dead center position and can be configured to move the movable magnetic weight radially outward. If present, the second magnetic biasing system may be located adjacent to the bottom dead center position and can be configured to move the movable magnetic weight radially inward.

In another aspect, the plurality of movable weight assemblies can be rotatable through a top dead center position and a bottom dead center position. The first magnetic biasing system may be located adjacent to the bottom dead center position and can be configured to move the movable magnetic weight radially inward. If present, the second magnetic biasing system may be located adjacent to the top dead center position and can be configured to move the movable magnetic weight radially outward.

In a second implementation of the invention, a rotational gravitational machine comprises a rotatable structure, configured to rotate about a rotation axis, and a plurality of movable weight assemblies carried by and jointly rotatable with the rotatable structure about the rotation axis. The movable weight assemblies are arranged radially spaced apart from the rotation axis and angularly spaced apart from each other. Each movable weight assembly comprises a movable magnetic weight configured for reciprocal radial translation between a radially innermost position relative to the rotation axis and a radially outermost position relative to the rotation axis. The rotational gravitational machine further comprises a first magnetic biasing system including a first electric motor and a first magnetic piston. The first magnetic piston is radially movable by the first electric motor and is configured to bias the movable magnetic weight in a direction from the radially innermost position towards the radially outermost position. The rotational gravitational machine further includes a second magnetic biasing system having a second electric motor and a second magnetic piston. The second magnetic piston is radially movable by the second electric motor and is configured to bias the movable magnetic weight in a direction from the radially outermost position towards the radially innermost position.

In a second aspect, the plurality of movable weight assemblies can be rotatable through a top dead center position, and the first magnetic biasing system can be located adjacent to the top dead center position.

In another aspect, the plurality of movable weight assemblies can be rotatable through a bottom dead center position, and the second magnetic biasing system can be located adjacent to the bottom dead center position.

In another aspect, each movable weight assembly may include a hollow housing inside which the movable magnetic weight is freely slidably housed such that the movable magnetic weight is movable between the radially innermost position relative and the radially outermost position.

In another aspect, each movable weight assembly can further include a braking system associated with the hollow housing. The braking system can be configured to maintain the movable magnetic weight in the radially outermost position as the movable weight assembly rotates downward. Alternatively or additionally, the braking system can be configured to maintain the movable magnetic weight in the radially innermost position as the movable weight assembly rotates upward.

In yet another implementation of the invention, a rotational gravitational machine comprises a rotatable structure, configured to rotate about a rotation axis, and a plurality of movable weight assemblies carried by and jointly rotatable with the rotatable structure about the rotation axis. The movable weight assemblies are arranged radially spaced apart from the rotation axis and angularly spaced apart from each other. Each movable weight assembly comprises a hollow housing, a movable magnetic weight and a braking system. The movable magnetic weight is freely slidably housed within the hollow housing and is configured for reciprocal radial translation between a radially innermost position relative to the rotation axis and a radially outermost position relative to the rotation axis. In turn, the braking system is associated with the hollow housing and is configured to maintain the movable magnetic weight in the radially outermost position as the movable weight assembly rotates downward and to maintain the movable magnetic weight in the radially innermost position as the movable weight assembly rotates upward. The rotational gravitational machine further includes a first magnetic biasing system having a first electric motor and a first magnetic piston. The first magnetic piston is radially movable by the first electric motor and is configured to bias the movable magnetic weight in a direction from the radially innermost position towards the radially outermost position. Additionally, the rotational gravitational machine is provided with a second magnetic biasing system having a second electric motor and a second magnetic piston. The second magnetic piston is radially movable by the second electric motor and is configured to bias the movable magnetic weight in a direction from the radially outermost position towards the radially innermost position.

In a second aspect, the braking system includes a first retainer for maintaining the movable magnetic weight in the radially innermost position and a second retainer for maintaining the movable magnetic weight in the radially outermost position. Each retainer is pivotally mounted on the hollow housing about a respective pivot pin and includes a first portion and a second portion extending from the pivot pin. The second portion is heavier than the first portion (for example by having the first and second portions constructed the same with the second portion being longer than the first portion) such that the center of gravity of the retainer is offset from the pivot pin and arranged within the second portion. Furthermore, each retainer is pivotable due to gravity to a position in which the second portion blocks radial translation of the movable magnetic weight within the hollow housing.

In another illustrative implementation of the invention, a method of rotating a weight about a rotation axis to generate a torque comprises the steps of:
  providing a rotational gravitational machine comprising:
    a rotatable structure, configured to rotate about a rotation axis,
    a plurality of movable weight assemblies carried by and jointly rotatable with the rotatable structure about the rotation axis, wherein the movable weight assemblies are arranged radially spaced apart from the rotation axis and angularly spaced apart from each other, wherein each movable weight assembly comprises a movable magnetic weight configured for reciprocal radial translation between a radially innermost position relative to the rotation axis and a radially outermost position relative to the rotation axis, and a first magnetic biasing system including a radially movable, first magnetic piston configured to bias the movable magnetic weight between the radially innermost position and the radially outermost position;

passing a first movable magnetic weight over the first magnetic biasing system by rotation of the rotatable structure, and moving the first magnetic piston adjacent to the first movable magnetic weight to magnetically bias the first movable magnetic weight to a radially outermost or innermost position to create a first torque arm such that an assembly formed by the rotatable structure and the plurality of movable weight assemblies is in an unbalanced condition about the rotation axis, the rotatable structure rotating about the rotation axis in response to the unbalanced condition to create a torque on the rotation axis.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a simple and efficient rotational gravitational machine that is capable of producing an output torque, for powering an external generator or for other applicable uses, by unbalancing an opposed pair of radially extending arms causing them to rotate about a central axis thereby rotating a central torque supplying shaft.

Figure 1:
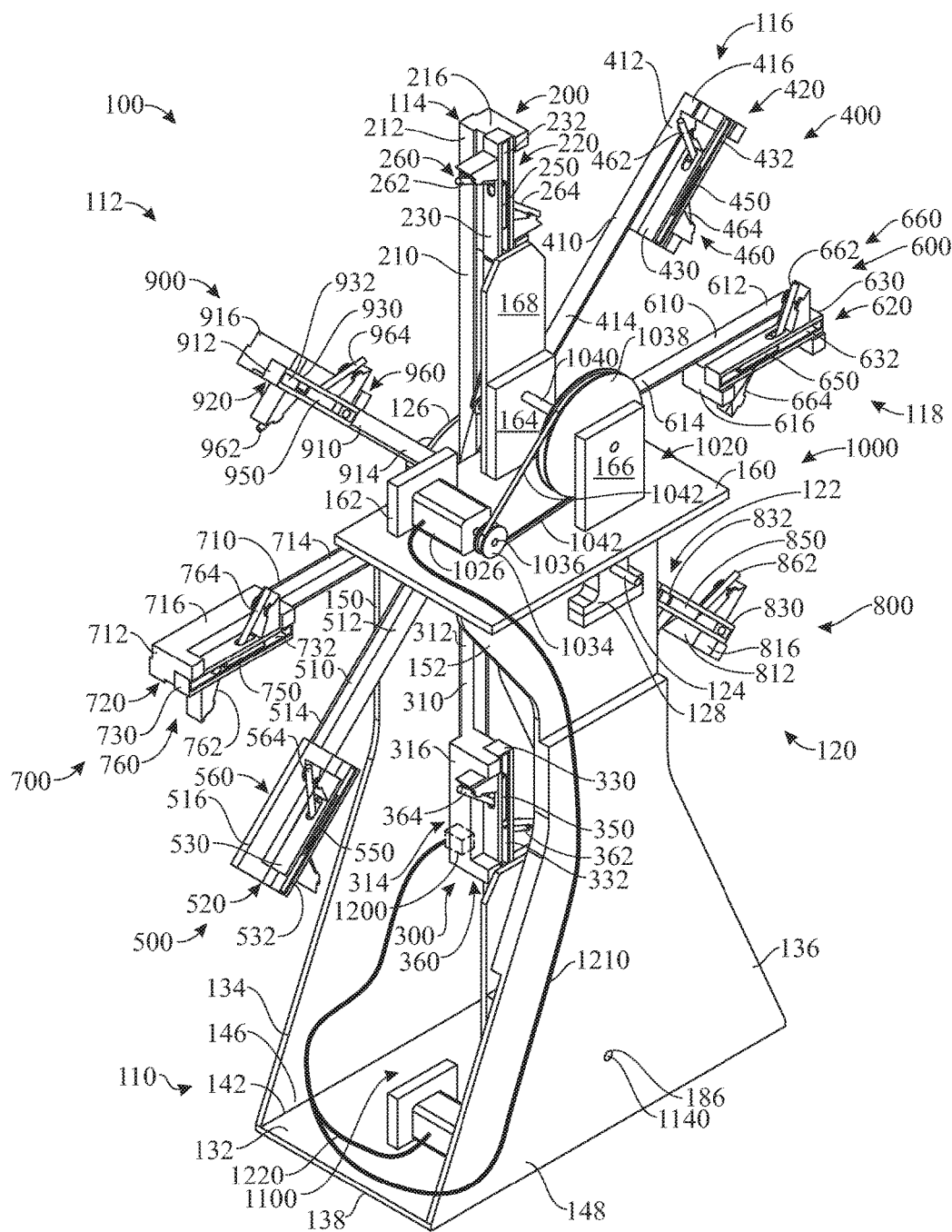
FIG. 1 presents a front left isometric view of a first embodiment of a rotational gravitational machine of the present invention.
Figure 2:
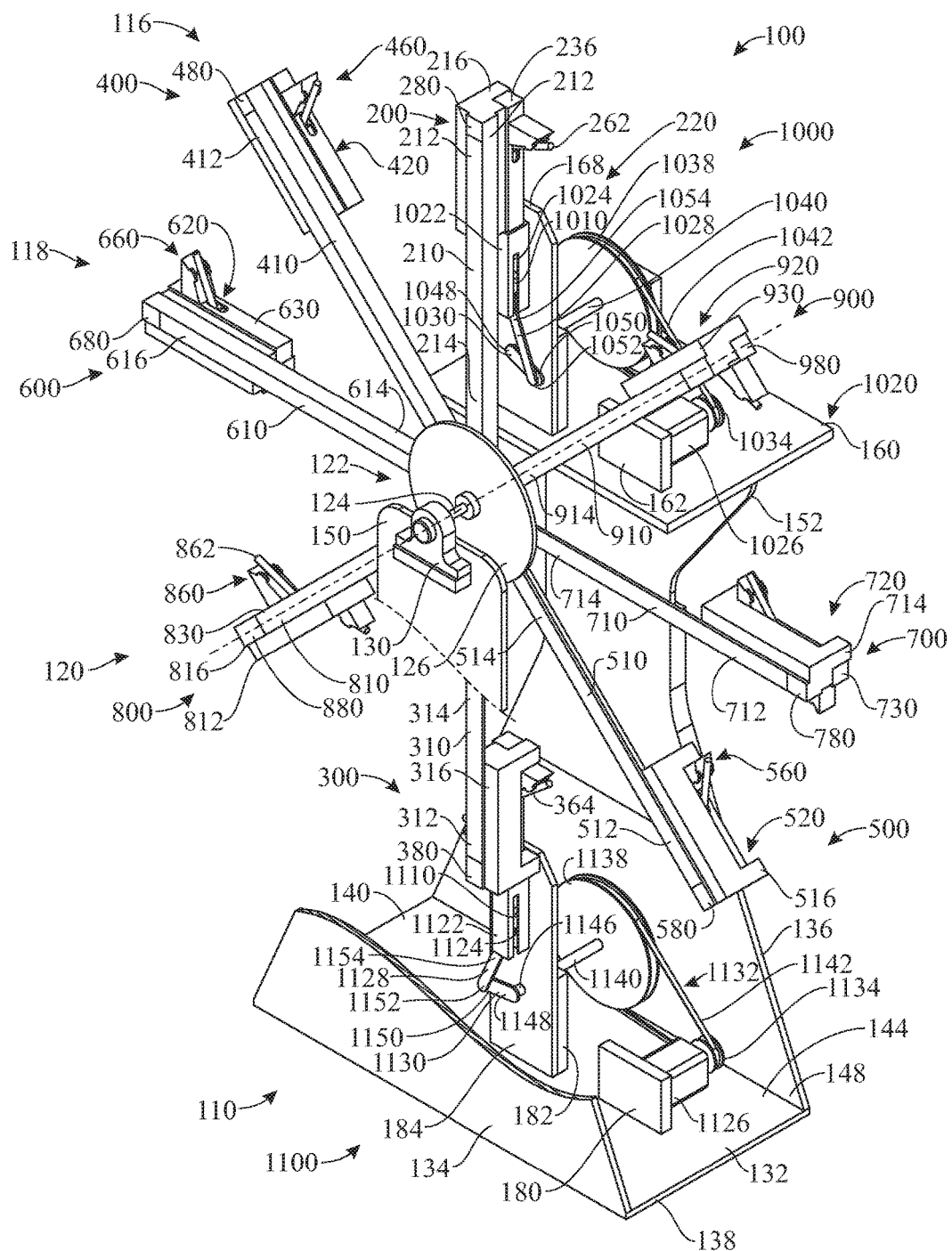
FIG. 2 presents a front right isometric view of the rotational gravitational machine of the present invention with a portion of a right side upright support removed for illustration.

Referring initially to FIGS. 1 and 2, a rotational gravitational device, system, apparatus or machine 100 is illustrated in accordance with an exemplary embodiment of the present invention, configured as a rotational torque-producing machine. The rotational gravitational machine 100 utilizes the force of gravity to create rotational torque. The rotational torque created by the rotational gravitational machine 100 can be used, for instance and without limitation, for generating electrical energy. The rotational gravitational machine 100 can be produced on a small, medium or large scale, and it may be desirable to locate all or part of it underground or in a secure facility to facilitate operation and maintenance.

Figure 3:
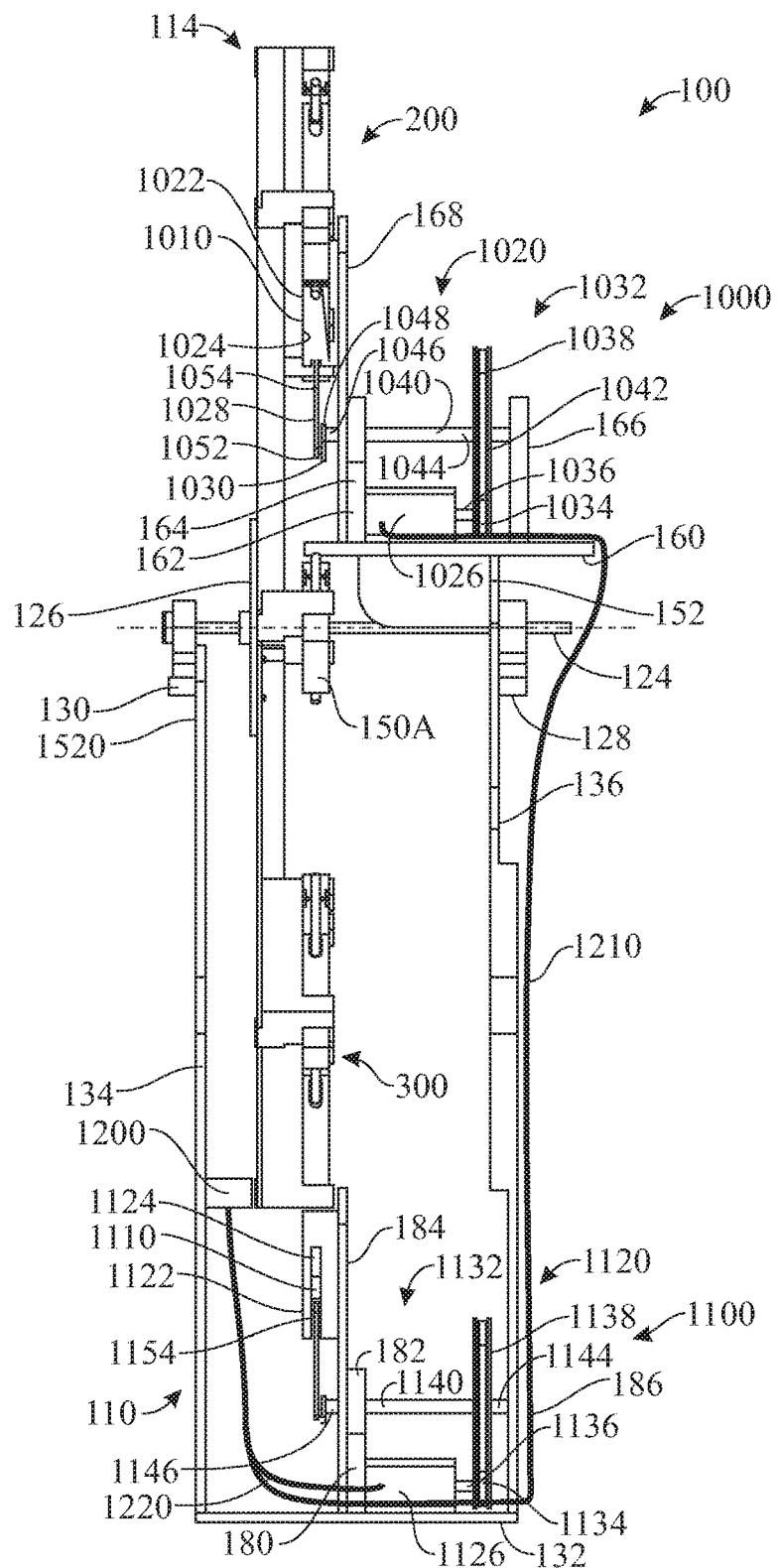
FIG. 3 presents an end view of the rotational gravitational machine of the present invention.

As shown, the rotational gravitational machine 100 generally includes a frame 110 and an arm array 112, rotatably mounted on the frame 110. In the disclosed embodiment, the arm array 112 includes a plurality of opposed arm pairs such as a first arm pair 114, a second arm pair 116, a third arm pair 118 and a fourth arm pair 120. It should be noted that, in contemplated alternative embodiments, there may be more or fewer than four opposed arm pairs. The first, second, third and fourth arm pairs 114, 116, 118 and 120, respectively, are affixed to and radially extend from a central hub assembly 122 rotatably mounted on the frame 110. The hub assembly 122 is rotatable about a rotation axis x-x (FIGS. 2 and 3). The hub assembly 122 includes an axle or shaft 124 arranged along the rotation axis x-x and a hub plate 126. The arm array 112 is affixed to, and extends radially outward from, the hub plate 126 while the shaft 124 is rotatably supported on the frame 110 by a pair of opposed bearings or journals 128 and 130. The shaft 124 and the hub plate 126 of the central hub assembly 122 are affixed or otherwise secured together such that rotation of the arm array 112 rotates the hub plate 126 and thus the shaft 124. It should be noted that the hub plate 126 in this embodiment is a circular disk and may have substantial weight to act as a flywheel to assist in keeping the arm array 112 in rotation about the hub assembly 122 after the rotation of the arm array 112 has begun.

The shaft 124 of the central hub assembly 122 can be connected, for instance and without limitation, to an external generator (not shown) for converting the rotational energy of the shaft 124 into electrical energy. As will be explained hereinbelow, by altering the weight distribution of the first, second, third and fourth arm pairs 114, 116, 118 and 120 radially relative to the central hub assembly 122 and, more particularly, to the shaft 124 and thus to the rotation axis x-x, the force of gravity on the first, second, third and fourth arm pairs 114, 116, 118 and 120 causes rotational motion of the pairs of arms about the rotation axis x-x to be maintained over time and to generate a torque with respect to the rotation axis x-x, thereby causing the shaft 124 to turn, and the turning of the shaft 124 to be able to be converted into electrical energy or be used for other purposes.

In order to support the arm array 112 and the hub assembly 122, the frame 110 includes a base 132 and a pair of right and left upright side supports 134 and 136 extending upwardly from the base 132. Specifically, the base 132 is generally rectangular having a front edge 138, a rear edge 140 and right and left side edges 142 and 144. A bottom edge 146 of the right upright side support 134 extends upwardly from the right side edge 142 of the base 132 and a bottom edge 148 of the left upright side support 136 extends upwardly from the left side edge 144 of the base 132. The base 132 and the right and left upright side supports 134 and 136, respectively, of the frame 110 may be affixed together in known manner or the frame 110 may be formed as a monolithic or single-piece unit.

The hub assembly 122 extends across and is rotatably mounted on the right and left upright side supports 134 and 136 at right and left top portions 150 and 152 of the right and left upright side supports 134 and 136. Specifically, journal 128 of the hub assembly 122 is mounted to the left top portion 152 of the left upright side support 136 and journal 130 is mounted to the right top portion 150 of the right upright side support 134. As noted above, the journals 128, 130 can be ball bearing mounts. Thus, the hub assembly 122 and arm array 112 are rotatably supported for rotation, about the rotation axis x-x, on the frame 110.

Alternative embodiments are however contemplated in which the frame can present different configurations which, similarly to the present embodiment, provide for an adequate rotatable support of the arm array 112 and the hub assembly 122. For instance, and without limitation, the frame can be a hanging structure, to which the arm array 112 and hub assembly 122 are rotatably coupled. In another example, the frame 110 can also consist in any applicable standing structure, and example of which is the frame 110 of the present embodiment. Any combination thereof is also contemplated.

With continued reference to FIGS. 1 and 2, the general components of the first, second, third and fourth arm pairs 114, 116, 118 and 120 will now be described. As noted above, the disclosed arm pairs are constructed to provide a torque on the hub assembly 122 and to maintain a rotation of the hub assembly 122 by changing the weight distribution along the lengths of the arm pairs thereby changing the torque arm lengths of each arm in the arm pairs. This allow gravity to pull down on individual arm assemblies of the arm pairs when the torque arm length is at its maximum distance from the hub assembly 122. Further, while there are four arm pairs disclosed, the system will work with more or fewer arm pairs or even with an uneven number of arm pairs. Additionally, the system will also work with arm assemblies, as described hereinbelow, that are not arranged in pairs but are spaced at equidistant radial arcs about the hub assembly 122 to prevent any imbalance as the arm array 112 is rotated about the hub assembly 122. For instance and without limitation, the arm array 112 can include five arms radially spaced apart 72 degrees.

Referring back to the present embodiment, and to FIGS. 1 and 2 in particular, the first arm pair 114 generally includes a first arm assembly 200 extending radially outward from the hub assembly 122 and a second arm assembly 300 also extending radially outward from the hub assembly 122 and, in this embodiment, extending diametrically opposite of the first arm assembly 200. Likewise, the second arm pair 116 includes a third arm assembly 400 extending radially outward from the hub assembly 122 and a fourth arm assembly 500 extending radially outward from the hub assembly 122 and diametrically opposite the third arm assembly 400. Similarly, the third arm pair 118 includes a fifth arm assembly 600 extending radially outward from the hub assembly 122 and a sixth arm assembly 700 also extending radially outward from the hub assembly 122 and diametrically opposite the fifth arm assembly 600. Finally, the fourth arm pair 120 includes a seventh arm assembly 800 extending radially outward from the hub assembly 122 and an eighth arm assembly 900 likewise extending radially outward from the hub assembly 122 and diametrically opposite the seventh arm assembly 800.

The description of the general components of the disclosed arm assemblies will start with the first arm pair 114, including the first arm assembly 200 and the second arm assembly 300, and will be followed through during the operation of the rotational gravitational machine as discussed in more detail hereinbelow. The general components of the second, third and fourth arm pairs, 116, 118 and 120, respectively, are identical and their description will follow the discussion of the first arm pair 114.

With respect to the first arm pair 114, best shown in FIG. 1, the first arm assembly 200 generally includes a chassis 210 affixed to and extending radially outward from the hub assembly 122 and a movable weight assembly 220 positioned on an outer or first end 212 of the chassis 210. An inner or second end 214 of the chassis 210 is affixed to the hub plate 126 of the hub assembly 122 (FIG. 2).

The movable weight assembly 220 is affixed to a mounting bracket 216, located at the first end 212 of the chassis 210, and generally includes an elongate rectangular hollow housing 230 defining an interior chamber 232 and a movable magnetic weight 250 positioned within the interior chamber 232. The movable magnetic weight 250 is formed from a relatively heavy material to produce a pronounced difference in the torque arms of the arm assemblies 200 and 300 of the first arm pair 114 as will be described in greater detail hereinafter. All the disclosed magnetic weights are similarly formed from a heavy magnetic material. The movable magnetic weight 250 is free to slide within the hollow housing 230 in order to change the effective torque arm length of the first arm assembly 200 as discussed herein. By changing the effective torque arm length of the first arm assembly 200, as well as the remaining arm assemblies discussed herein, the hub assembly 122 is rotated about the rotation axis x-x since the first arm assembly 200, due to gravity, pulls harder on one side of the rotation (the downward stroke or sweep) wherein the movable magnetic weight is at a maximum radial distance from the rotation axis x-x, than on the other side of the rotation (the upward stroke or sweep) wherein the movable magnetic weight 250 is at a minimum radial distance from the rotation axis x-x as discussed in detail hereinbelow.

In order to maintain the movable magnetic weight 250 at its maximum and minimum radial distances from the rotation axis x-x during rotation, the first arm assembly 200 can additionally include a braking system 260. This is desirable as the movable magnetic weight 250 is free to slide within the interior chamber 232 in the hollow housing 230. The braking system includes first and second retainers 262 and 264, respectively, which alternately retain the movable magnetic weight 250 in either a radially innermost position or a radially outermost position within the hollow housing 230.

Similarly, the second arm assembly 300 generally includes a chassis 310 affixed to and extending radially outward from the hub assembly 122 and a movable weight assembly 320 positioned on an outer or first end 312 of the chassis 310. An inner or second end 314 of the chassis 310 is affixed to the hub plate 126 of the hub assembly 122 (FIG. 2).

The movable weight assembly 320 is affixed to a mounting bracket 316, located at the first end 312 of the chassis 310, and generally includes an elongate rectangular hollow housing 330 defining an interior chamber 332 and a movable magnetic weight 350 positioned within the interior chamber 332. The movable magnetic weight 350 is free to slide within the hollow housing 330 in order to change the effective torque arm length of the second arm assembly 300 as discussed hereinabove with regard to the first arm assembly 200. The second arm assembly 300 also includes a braking system 360 having first and second retainers 262 and 264, respectively, which alternately retain the movable magnetic weight 350 in either a radially innermost position or a radially outermost position within the hollow housing 330.

As noted hereinabove, the first and second arm assemblies 200 and 300, respectively, are diametrically opposed to each other such that, when the movable magnetic weight 250 of the first arm assembly 200 is in its radially outermost position relative to the rotation axis x-x, the movable magnetic weight 350 of the second arm assembly 300 is in its radially innermost position. This produces an imbalance in the arm array 112 that causes or facilitates rotation of the arm array 112 about the hub assembly 122 and, more particularly, about the rotation axis x-x, to generate a torque on the shaft 124.

The remaining arm assemblies of the remaining arm pairs are constructed, oriented and operated identically to the first and second arm assemblies 200 and 300, respectively. For example, the second arm pair 116 includes a third arm assembly 400 which generally includes a chassis 410 affixed to and extending radially outwardly from the hub assembly 122 and a movable weight assembly 420 positioned on an outer or first end 412 of the chassis 410. An inner or second end 414 of the chassis 410 is affixed to the hub plate 126 of the hub assembly 122. The movable weight assembly 420 is affixed to a mounting bracket 416, located at the first end 412 of the chassis 410, and generally includes an elongate rectangular hollow housing 430 defining an interior chamber 432 and a movable magnetic weight 450 positioned within the interior chamber 432. The movable magnetic weight 450 is free to slide within the hollow housing 430 in order to change the effective torque arm length of the third arm assembly 400. The third arm assembly 400 also includes a braking system 460 having first and second retainers 462 and 464, respectively, which alternately retain the movable magnetic weight 450 in either a radially innermost position or a radially outermost position within the hollow housing 430.

The second arm pair 116 also includes a fourth arm assembly 500, diametrically opposite the third arm assembly 400, which generally includes a chassis 510 affixed to and extending radially outwardly from the hub assembly 122 and a movable weight assembly 520 positioned on an outer or first end 512 of the chassis 510. An inner or second end 514 of the chassis 510 is affixed to the hub plate 126 of the hub assembly 122. The movable weight assembly 520 is affixed to a mounting bracket 516, located at the first end 512 of the chassis 510, and generally includes an elongate rectangular hollow housing 530 defining an interior chamber 532 and a movable magnetic weight 550 positioned within the interior chamber 532. The movable magnetic weight 550 is free to slide within the hollow housing 530 in order to change the effective torque arm length of the fourth arm assembly 500. The fourth arm assembly 500 also includes a braking system 560 having first and second retainers 562 and 564, respectively, which alternately retain the movable magnetic weight 550 in either a radially innermost position or a radially outermost position within the hollow housing 530.

Likewise, the third arm pair 118 includes diametrically opposed fifth and sixth arm assemblies 600 and 700, respectively. The fifth arm assembly 600 generally includes a chassis 610 affixed to and extending radially outwardly from the hub assembly 122 and a movable weight assembly 620 positioned on an outer or first end 612 of the chassis 610. An inner or second end 614 of the chassis 610 is affixed to the hub plate 126 of the hub assembly 122. The movable weight assembly 620 is affixed to a mounting bracket 616, located at the first end 612 of the chassis 610, and generally includes an elongate rectangular hollow housing 630, defining an interior chamber 632, and a movable magnetic weight 650 positioned within the interior chamber 632. The movable magnetic weight 650 is free to slide within the hollow housing 630 in order to change the effective torque arm length of the fifth arm assembly 600. The fifth arm assembly 600 also includes a braking system 660 having first and second retainers 662 and 664, respectively, which alternately retain the movable magnetic weight 650 in either a radially innermost position or a radially outermost position within the hollow housing 630.

The sixth arm assembly 700 of the third arm pair 118 generally includes a chassis 710 affixed to and extending radially outwardly from the hub assembly 122 and a movable weight assembly 720 positioned on an outer or first end 712 of the chassis 710. An inner or second end 714 of the chassis 710 is affixed to the hub plate 126 of the hub assembly 122. The movable weight assembly 720 is affixed to a mounting bracket 716, located at the first end 712 of the chassis 710, and generally includes an elongate rectangular hollow housing 730, defining an interior chamber 732, and a movable magnetic weight 750 positioned within the interior chamber 732. The movable magnetic weight 750 is free to slide within the hollow housing 730 in order to change the effective torque arm length of the sixth arm assembly 700. The sixth arm assembly 700 also includes a braking system 760 having first and second retainers 762 and 764, respectively, which alternately retain the movable magnetic weight 750 in either a radially innermost position or a radially outermost position within the hollow housing 730.

Finally, the fourth arm pair 120 includes a seventh arm assembly 800 and an eighth arm assembly 900. The seventh arm assembly 800 of the fourth arm pair 120 generally includes a chassis 810 affixed to and extending radially outwardly from the hub assembly 122 and a movable weight assembly 820 positioned on an outer or first end 812 of the chassis 810. An inner or second end 814 of the chassis 810 is affixed to the hub plate 126 of the hub assembly 122. The movable weight assembly 820 is affixed to a mounting bracket 816, located at the first end 812 of the chassis 810, and generally includes an elongate rectangular hollow housing 830, defining an interior chamber 832, and a movable magnetic weight 850 positioned within the interior chamber 832. The movable magnetic weight 850 is free to slide within the hollow housing 830 in order to change the effective torque arm length of the seventh arm assembly 800. The seventh arm assembly 800 also includes a braking system 860 having first and second retainers 862 and 864, respectively, which alternately retain the movable magnetic weight 850 in either a radially innermost position or a radially outermost position within the hollow housing 830.

Likewise, the eighth arm assembly 900 of the fourth arm pair 120 generally includes a chassis 910 affixed to and extending radially outwardly from the hub assembly 122 and a movable weight assembly 920 positioned on an outer or first end 912 of the chassis 910. An inner or second end 914 of the chassis 910 is affixed to the hub plate 126 of the hub assembly 122. The movable weight assembly 920 is affixed to a mounting bracket 916, located at the first end 912 of the chassis 910, and generally includes an elongate rectangular hollow housing 930, defining an interior chamber 932, and a movable magnetic weight 950 positioned within the interior chamber 932. The movable magnetic weight 950 is free to slide within the hollow housing 930 in order to change the effective torque arm length of the eighth arm assembly 900. The eighth arm assembly 900 also includes a braking system 960 having first and second retainers 962 and 964, respectively, which alternately retain the movable magnetic weight 950 in either a radially innermost position or a radially outermost position within the hollow housing 930.

Referring now to FIGS. 1-3, in order to reciprocally move the disclosed movable magnetic weights between their radially outermost positions and their radially innermost positions within their respective hollow housings, the rotational gravitational machine 100 includes a pair of first and second magnetic biasing systems 1000 and 1100. The first magnetic biasing system 1000 magnetically moves or biases the disclosed movable magnetic weights between their radially innermost position with respect to the rotation axis x-x to their radially outermost position with respect to the rotation axis x-x and the second magnetic biasing system 1100 magnetically moves or biases the disclosed movable magnetic weights back from the radially outermost position to the radially innermost position.

The first magnetic biasing system 1000 generally includes a first magnetic piston 1010 and a drive system 1020 for moving the first magnetic piston 1010 relative to the disclosed movable magnetic weights in the arm array 112. The first magnetic piston 1010 is contained within a hollow housing 1022, having an interior chamber 1024, and is movable within the interior chamber 1024 in a vertical direction to position the first magnetic piston 1010 closer to or away from a movable magnetic weight. As discussed in more detail hereinbelow, due to the identical facing polarities, movement of the magnetic piston first 1010 towards a movable magnetic weight drives the movable magnetic weight away from the first magnetic piston 1010 to magnetically bias the movable magnetic weight upward to the radially outermost position within its respective elongate rectangular hollow housing.

The drive system 1020 generally includes an electric motor 1026 connected to the first magnetic piston 1010 through a connecting rod 1028 extending from the first magnetic piston 1010 and a crank arm 1030 pivotally connected to the connecting rod 1028. In this embodiment, the electric motor 1026 is connected to the first magnetic piston 1010 by a reduction unit 1032 having a first pulley 1034 mounted on a drive shaft 1036 of the electric motor 1026 and a larger diameter second pulley 1038 connected to a connecting shaft 1040. A drive belt 1042 extends between the first and second pulleys 1034 and 1038, respectively. Specifically, as best shown in FIGS. 2 and 3, a first end 1044 of the connecting shaft 1040 is connected to the second pulley 1038 and a second end 1046 of the connecting shaft 1040 is connected to a first end 1048 of the crank arm 1030. As best shown in FIG. 2, a second end 1050 of the crank arm 1030 is in turn connected to a first end 1052 of the connecting rod 1028. A second end 1054 of the connecting rod 1028 is connected to the first magnetic piston 1010. Thus, rotation of the electric motor 1026 moves the first magnetic piston 1010 up and down within the hollow housing 1022. In some embodiments, the electric motor 126 can be a stepper motor, in which case the first and second pulleys 1034 and 1038 can have the same diameter so that when the stepper motor rotates one revolution the crank arm 1030 also rotates one revolution.

The first magnetic biasing system 1000 is located adjacent the topmost arc of the arm array 112 such that the first magnetic biasing system 1000 biases a movable magnetic weight to its radially outermost position as it passes over the first magnetic biasing system 100. The first magnetic piston 1010 is positioned at the top dead center ("TDC") point of rotation of the arm array 112.

In order to support the first magnetic biasing system 1000, the frame 110 includes a top plate 160 extending between the top right portion bracket 150a rotatably mounted to the connecting shaft 1040 and the top left portion 152 of the upright left side support 136. The electric motor 1026 is positioned on the top plate 160 and held in place by a motor plate 162. The connecting shaft 1040 is rotatably supported above the top plate 160 by a pair of upwardly extending shaft plates 164 and 166. Finally, a piston plate 168 is attached to the shaft plate 164 and supports the hollow housing 1022.

With continued reference to FIGS. 2 and 3, the second magnetic biasing system 1100 is substantially similar to the first magnetic biasing system 1000 and generally includes a second magnetic piston 1110 and a drive system 1120 to move the second magnetic piston 1110 toward and away from a movable magnetic weight as the movable magnetic weight passes over the second magnetic biasing system 1100 at the bottom of the rotational arc of the arm array 112 to bias a movable magnetic weight upward to the radially innermost position. The second magnetic piston 1110 is contained within a hollow housing 1122 defining an interior chamber 1124. An electric motor 1126 is provided and is connected to the second magnetic piston 1110 through a connecting rod 1128 and a crank arm 1130. A reduction unit 1132 is provided to slow the rotation of the crank arm 1130 relative to the speed of the electric motor 1126 and generally includes a first pulley 1134 mounted on a drive shaft 1136 of the electric motor 1126 and a second pulley 1138 mounted on a connecting shaft 1140 affixed to the crank arm 1130. A drive belt 1142 connects the first pulley 1134 to the second pulley 1138. In some embodiments, the electric motor 1126 can be a stepper motor, in which case the first and second pulleys 1134 and 1138 can have the same diameter so that when the stepper motor rotates one revolution the crank arm 1130 also rotates one revolution.

Though not specifically shown in the drawings, the rotational gravitational machine 100 may include or be connected to an electrical power source for powering the machine, and more specifically, for powering the electric motors 1026, 1126. For example, the rotational gravitational machine 100 may be connected to an external electrical power grid or source. In another non-limiting example, the rotational gravitational machine 100 may be provided with an internal electrical source, such as one or more rechargeable or non-rechargeable batteries. In some embodiments, power provided by the electrical power source may be fed, for instance and without limitation, to an AC/DC or DC/DC power converter, which feeds a resulting DC electrical power to a controller or other processor unit which is electrically connected to two drivers that are in turn electrically connected to the electric motors 1026 and 1126, respectively.

As shown, a first end 1144 of the connecting shaft 1140 is connected to the second pulley 1138 while a second end 1146 of the connecting shaft 1140 is connected to a first end 1148 of the crank arm 1130. A second end 1150 of the crank arm 1130 is connected to a first end 1152 of the connecting rod 1128 and a second end 1154 of the connecting rod 1128 is connected to the second magnetic piston 1110. Operation of the electric motor 1126 thereby moves the second magnetic piston 1110 up and down within the hollow housing 1122 to approach and retract away the movable magnetic piston 1110 from a movable magnetic weight passing over the second magnetic biasing system 1100. The second magnetic piston 1110 is located at the bottom most arc of the rotation of the arm array 112 or a bottom dead center ("BDC") point of rotation of the arm array 112.

The second magnetic biasing system 1110 is mounted on the base 132 of the frame 110. The electric motor 1126 is mounted on the base 132 and secured to a motor plate 180. The connecting shaft 1140 is supported at its first end 1144 by the upright left side support 136 and at its second end 1146 by a shaft plate 182 and a piston plate 184 both extending upwardly from the base 132 of the frame 110. A hole 186 is formed through the upright left side support 136 for support of the first end 1144 of the connecting shaft 1140. The hollow housing 1122 is also supported on the piston plate 184.

In order to trigger or operate the first and second magnetic biasing systems 1000 and 1100, respectively, as a movable weight assembly, carried on a chassis of an arm assembly, approaches, passes over and departs from the first and second magnetic biasing systems 1000 and 1100, the rotational gravitational machine 100 further includes a proximity sensor or limit switch 1200 connected to the electric motor 1026 of the first magnetic biasing system 1000 by a first wire 1210 and to the electric motor 1126 of the second magnetic biasing system 1100 by a second wire 1220, as shown in FIGS. 1 and 2. The limit switch 1200 is, in this embodiment, positioned on the upright right side support 134 at a location directly opposite the hollow housing 1122 of the second magnetic biasing system 1100. In a preferred embodiment, the limit switch 1200 is of a normally-open type magnetic reed switch that prevents current to flow to the first and second electric motors 1026 and 1126 until activated or tripped by the immediate proximity of one of the arm assemblies of one of the pairs of arms.

It should be noted that, while the electric motors 1026, 1126 require some electrical power consumption, due to the unbalanced distribution of the magnetic weights the energy required to operate the electric motors 1026, 1126 to move the magnetic pistons is less than that generated by rotation of the arm array 112 due to the force of gravity. The disclosed rotational gravitational machine 100, and particularly the hub assembly 122, can be connected, for instance and without limitation, to a generator or other similar equipment and be used to generate energy in locations and/or situations where other more conventional devices are undesired or would be too costly or polluting. For example, the hub assembly shaft 124 can be connected to a generator, the generator being connected to ta charge controller and a battery. An inverter can be connected to the battery to produce AC power, part of which can be directed to the rotational gravitational machine 100 for powering the electric motors 1026 and 1126 (in the event of using AC powered electric motors) and a remaining part of which can be used for feeding other external equipment or devices. One of ordinary skill in the art will understand that many types of electric circuit designs may be employed to utilize the torque and rotation of the hub assembly 122 provided by the rotational gravitational machine 100. These various circuit designs will not be described in detail so as not to obscure the invention. Alternatively or additionally, the torque provided by the shaft 124 can be used to directly power a mechanical device such as, for example, a grain grinding wheel, a water pump or any other device requiring a rotational input to operate.

As best shown in FIG. 2, in order to activate or "trip" the limit switch 1200 as an arm assembly approaches the second magnetic biasing system 1100, each of the chassis of the arm assemblies of the arm array 112 carries a magnetic strip at its outward most or first end. For example, as shown, the first arm assembly 200 carries a first magnetic strip 280 at the first end 212 of the chassis 210. Likewise, the second arm assembly 300 carries a second magnetic strip 380 the first end 312 of the chassis 310. The third and fourth arm assemblies 400 and 500 similarly carry third and fourth magnetic strips 480 and 580 at the first ends 412 and 512 of their respective chassis 410 and 510, respectively. The fifth and sixth arm assemblies 600 and 700 carry fifth and sixth magnetic strips 680 and 780 at respective first ends 612 and 712 of their chassis 610 and 710, respectively. Finally, the seventh and eighth arm assemblies 800 and 900 carry seventh and eighth magnetic strips 880 and 980 at the first ends 812 and 912 of their chassis 810 and 910, respectively.

Figure 4:
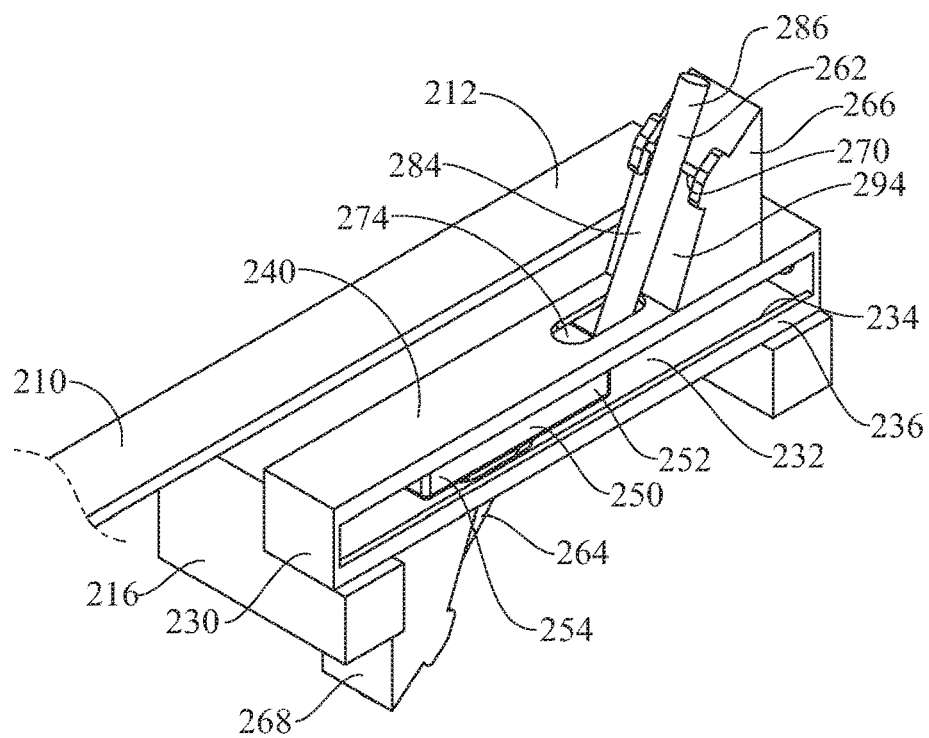
FIG. 4 presents a top, side isometric view of a movable magnetic weight assembly of the rotational gravitational machine of the present invention.
Figure 5:
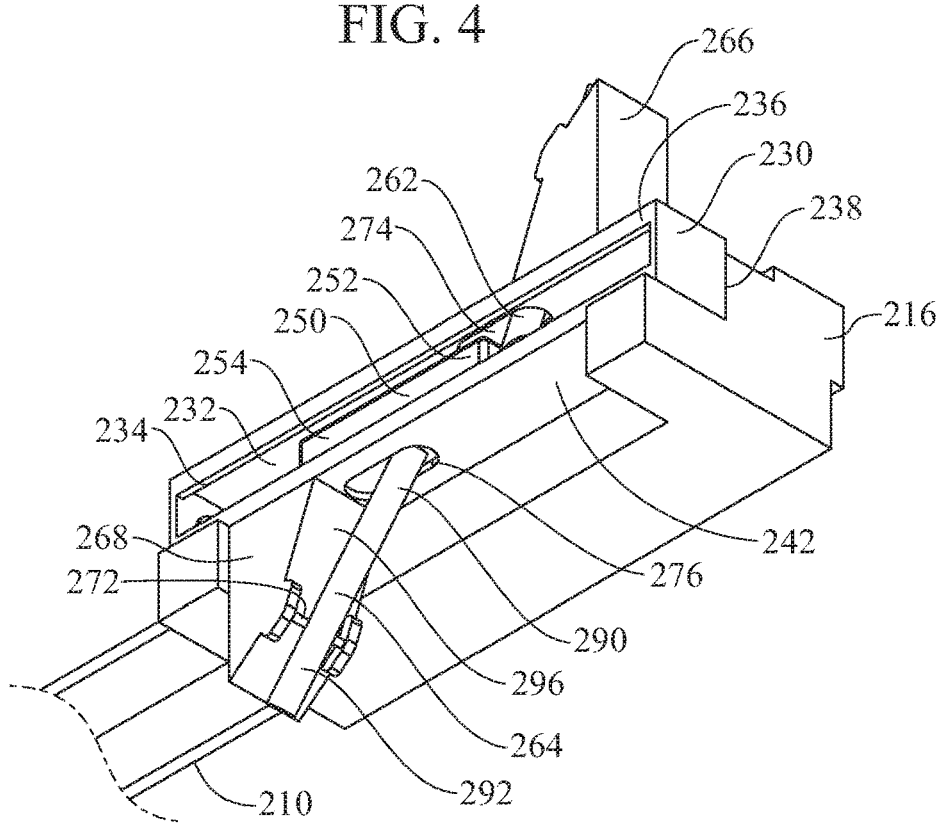
FIG. 5 presents a bottom, side isometric view of the movable magnetic weight assembly of FIG. 4.

Turning for the moment to FIGS. 4 and 5, the specific details of the movable weight assembly 220 of the first arm assembly 200, including the braking system 260, will now be described. It should be noted that all the remaining movable weight assemblies 320, 420, 520, 620, 720, 820 and 920, along with their associated braking systems, are constructed and function identically to that described herein with regard to the movable weight assembly 220 and the braking system 260. As noted hereinabove, the movable weight assembly 220 is carried on the mounting bracket 216 formed on the first end 212 of the chassis 210.

The hollow housing 230 can include an elongate slot 234 formed in an outer face 236 of the hollow housing 230 and open to the interior chamber 232. The slot 234 may be provided to allow an operator to pre-position the movable magnetic weight 250 during initial operation as well as allowing an operator to see the location of the movable magnetic weight 250 during operation in case the system fails to operate properly. The slot 234 is narrower than the width of the movable magnetic weight 250 to prevent the movable magnetic weight from falling out of the hollow housing 230. Alternative embodiments are contemplated, however, in which the hollow housing 230 does not include such elongate slot 234. An inner face 238 of the hollow housing 230 is affixed to the mounting bracket 216. The disclosed braking system 260 is mounted on first and second sides 240 and 242 of the hollow housing 230 as described in more detail hereinbelow.

The position of the movable magnetic weight 250 within the hollow housing 230 is the primary cause of rotation of the arm array 112 about the rotation axis x-x to generate a torque on the shaft 124 which drives an external electrical generator or other torque-receiving system. The movable magnetic weight 250 is free to move in the interior chamber 232 of the hollow housing 230. The outer surface of the movable magnetic weight 250 and the interior of the hollow housing 230 may be coated with a movement-enhancing substance such as, but not limited to, Teflon™. The movable magnetic weight 250 is formed from a substantially heavy material that maintains a magnetic charge and, in this embodiment, it oriented such that a polarized or charged first end or north pole end 252 faces away from the rotation axis x-x of the hub assembly 122 and an oppositely polarized or charged second end or south pole end 254 faces toward the rotation axis x-x.

The braking system 260 is provided to hold the movable magnetic weight 250 in a radially innermost position within the hollow housing 230 as the movable weight assembly 220 of first arm assembly 200 rises up during rotation of the arm array 112. This gives the first arm assembly 200 a relatively short torque arm length. The braking system 260 is also configured to hold the movable magnetic weight 250 in a radially outermost position within the hollow housing 230 to give the first arm assembly 200 a longer torque arm length as the movable weight assembly 220 moves downward due to the force of gravity on the movable weight assembly 220. It is this imbalance in the torque arm lengths of opposed arm pairs, due to the inward and outward positioning of movable magnetic weights carried on opposed arm pairs, such as movable magnetic weights 250 and 350, that causes a differential gravitational pull on the arm array 112 to rotate about the rotation axis x-x to generate a torque.

The braking system 260 includes, as noted hereinabove, a first retainer 262 and a second retainer 264. The first retainer 262 maintains the movable magnetic weight 250 in the radially innermost position within the hollow housing 230 as the movable weight assembly 220 is rising during rotation about the rotation axis x-x and the second retainer 264 maintains the movable magnetic weight 250 in the radially outermost position within the hollow housing 230 as the movable weight assembly 220 rotates downward about the rotation axis x-x due to the force of gravity. The first retainer 262 is pivotally mounted on a first support stop 266 positioned on the first side 240 of the hollow housing 230 and the second retainer 262 is pivotally mounted on a second support stop 268 positioned on the second side 242 of the hollow housing 230. A first pivot pin 270 or pivotable connection rotatably supports the first retainer 262 on the first support stop 266 and a second pivot pin 272 or pivotable connection rotatably supports the second retainer 262 on the second support stop 268. As shown, the hollow housing 230 includes a slot 274 formed through the first side 240 of the hollow housing 230 and a slot 276 formed through the second side 242 of the hollow housing 230. The first and second slots 274 and 276 are provided to allow the first and second retainers 262 and 264 to enter the interior chamber 232 of the hollow housing 230 and block or lock the position of the movable magnetic weight 250 within the hollow housing 230.

The motions of the first and second retainers 262 and 264 into and out of their respective slots 274 and 276 in the hollow housing 240 are due to gravity as the arm array 112 rotates about the rotation axis x-x. For this to happen, the first retainer 262 is split into two uneven sections including a longer and thus heavier locking section 284 that enters the slot 274 and engages the movable magnetic weight 250. The locking section 284 extends towards the slot 274 from the first pivot pin 270 and a lighter and shorter counterweight section 286 that extends away from the first pivot pin 270 in the opposite direction from that of the locking section 284. The center of gravity of the first retainer 262 is offset from the first pivot pin 270 and arranged within the locking section 284 of the first retainer 262. Similarly, the second retainer 264 is split into two uneven sections including a longer, heavier locking section 290 that extends toward and enters the slot 276 to engage the movable magnetic weight 250 and a shorter, lighter counterweight section 292 oriented in the opposite direction about the second pivot pin 272. The center of gravity of the second retainer 264 is offset from the second pivot pin 272 and arranged within the locking section 290 of the second retainer 264. A flat, angled surface 294 on the first support stop 266 and a flat, angled surface 296 on the second support stop 268 are configured to arrest and limit the rotation of the respective first and second retainers 262 and 264, respectively, as the arm array 112 rotates about the rotation axis x-x.

Figure 6:
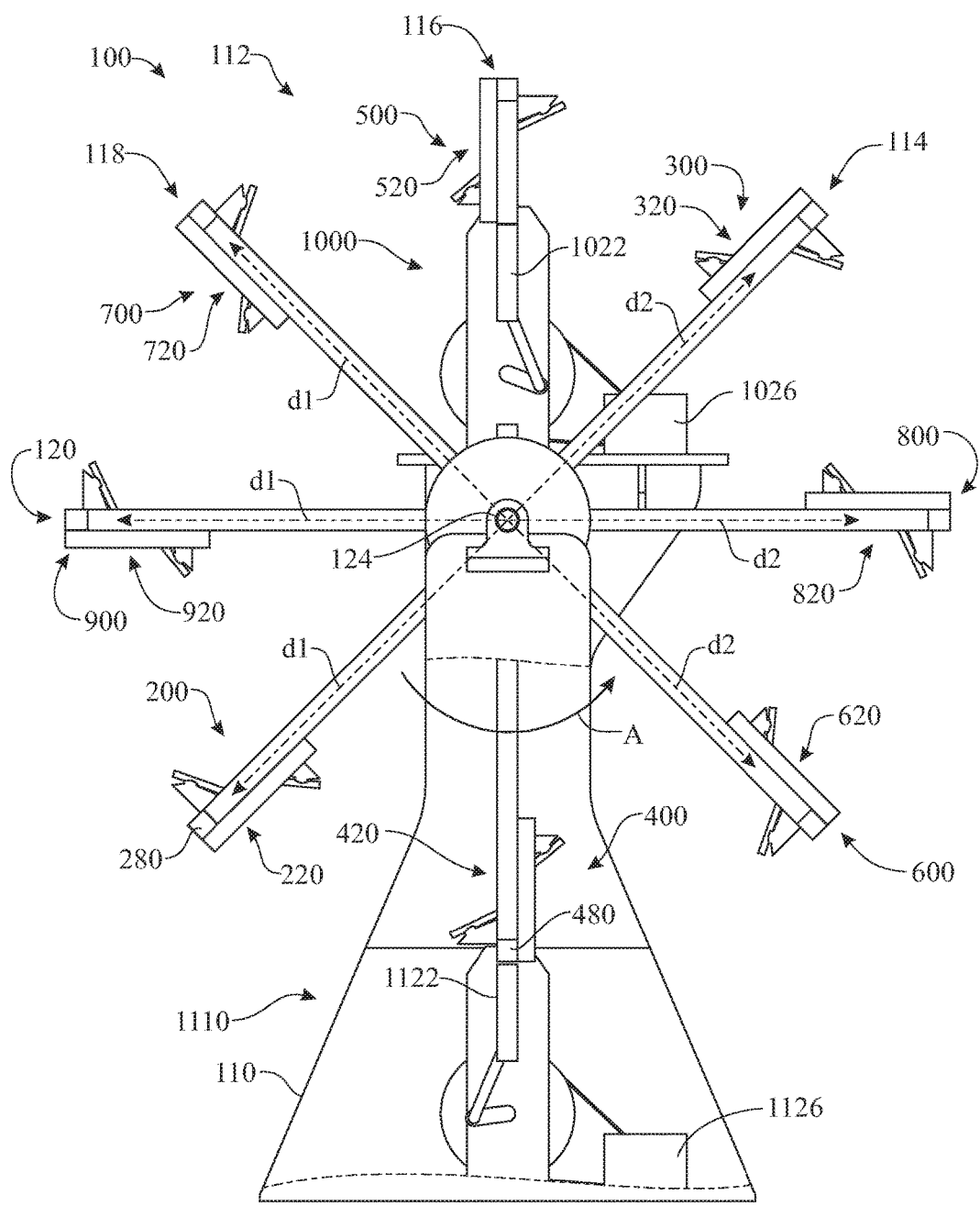
FIG. 6 presents a side elevation view, taken from the right, of the rotational gravitational machine of the present invention with a portion of the right side upright support removed for illustration.

Turning now to FIGS. 6-11, and initially with regard to FIG. 6, the operation of the rotational gravitational machine 100 to rotate the shaft 124 and thus produce a useful output torque which can be used to power an external electrical generator or for other applicable uses will now be described. Initially, without power to the rotational gravitational machine 100, the disclosed free-floating and movable magnetic weights will all naturally assume various positions within their respective housings due to the force of gravity. Thus, some of the movable magnetic weights will be in the incorrect positions within their respective cylinders and will need to be prepositioned. For example, all the movable weight assemblies on the upswing side of rotation of the arm array 112 (the right side as viewed in FIG. 6), i.e. movable weight assemblies 320, 620 and 820 will need to have their movable magnetic weights moved to the radially innermost position within the housings and the movable weight assemblies on the downswing side of rotation of the arm array 112 (the left side as viewed in FIG. 6), i.e. movable weight assemblies 220, 720 and 920, will need to have their movable magnetic weights moved to the radially outermost positions within the respective housings. In some embodiments, such as the present embodiment, this can be done manually by inserting a stick, pole or other device through holes in end plates of the housings (not shown) or through the respective slots in the housings. The respective braking systems associated with each of the movable weight assemblies will then operate to keep the movable magnetic weights in their initial positions. For the arm assemblies 400 and 500 of the second arm pair 116, positioned at the BDC and TDC positions respectively, the movable magnetic weight 450 in the movable weight assembly 420 would be moved to its radially innermost position and the movable magnetic weight 550 in the movable weight assembly 520 would be moved to its radially outermost position.

In order to prevent any inadvertent rotation of the arm array 112 due to the imbalance in the weight distributions along the various arm assemblies, an additional brake (not shown) may be applied to the shaft 124 to prevent premature rotation of the arm array 112. This brake may be hydraulic, frictional or simply a bar or bracket preventing rotation of the arm array 112 until removed.

In the initial position, where two of the arm assemblies, for example arm assembly 500 and arm assembly 400 of the second arm pair 116 are in the TDC and BDC positions respectively, the power to the system is turned off and the first and second magnetic pistons 1010 and 1110, respectively, are moved to the bottoms of their respective cylinders or hollow housings 1022 and 1122.

Power to the rotational gravitational machine 100, and in particular to the first and second magnetic biasing system 1000 and 1100 can now be supplied. Since the magnetic strip 480 on the arm assembly 400 is immediately adjacent the limit switch 1200, the limit switch 1220, which is a normally-open type switch, is moved to a closed position sending current to flow to the first and second magnetic biasing systems 1000 and 1100.

The following discussion of the operation of the rotational gravitational machine 100 will be given with respect to the first arm pair 114 and, in particular, to the arm assembly 200, including the first movable weight assembly 220, and its associated components as it approaches, aligns itself with and passes by the first and second magnetic biasing systems 1000 and 1100. Since the second arm assembly 300 is also part of the first arm pair 114 and is diametrically opposite the first arm assembly 200, the motions of its movable magnetic weight and braking system will be opposite to that discussed hereinbelow with regard to the first arm assembly 200. It should be noted that the remaining arm assemblies of the remaining second, third and fourth arm pairs 116, 118 and 120, respectively, function identically to that described for the first arm pair 114.

Figure 7:
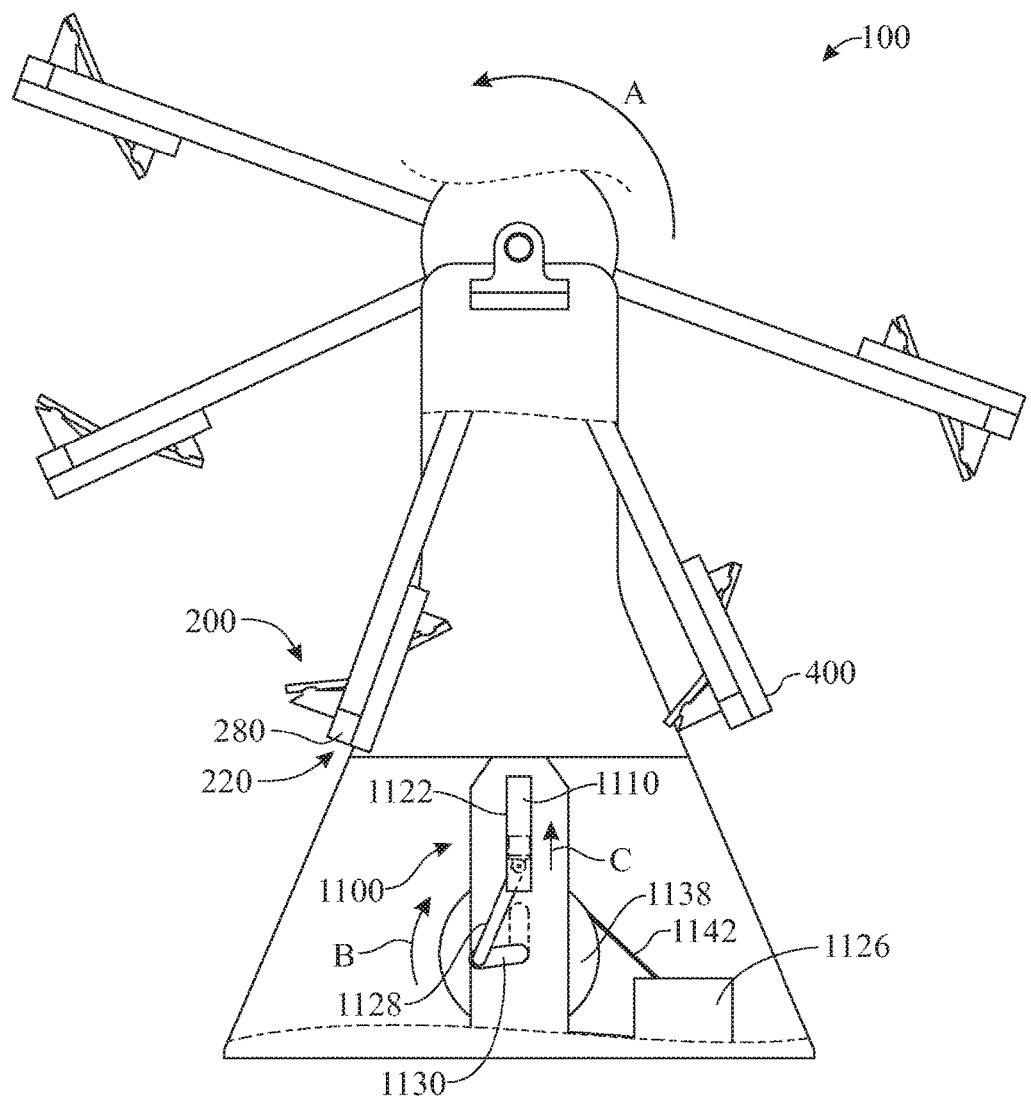
FIG. 7 presents a partial side elevation view, similar to FIG. 6, of the rotational gravitational machine of the present invention illustrating a movable magnetic weight assembly of the rotational gravitational machine approaching a bottom magnetic piston of the rotational gravitational machine.
Figure 8:
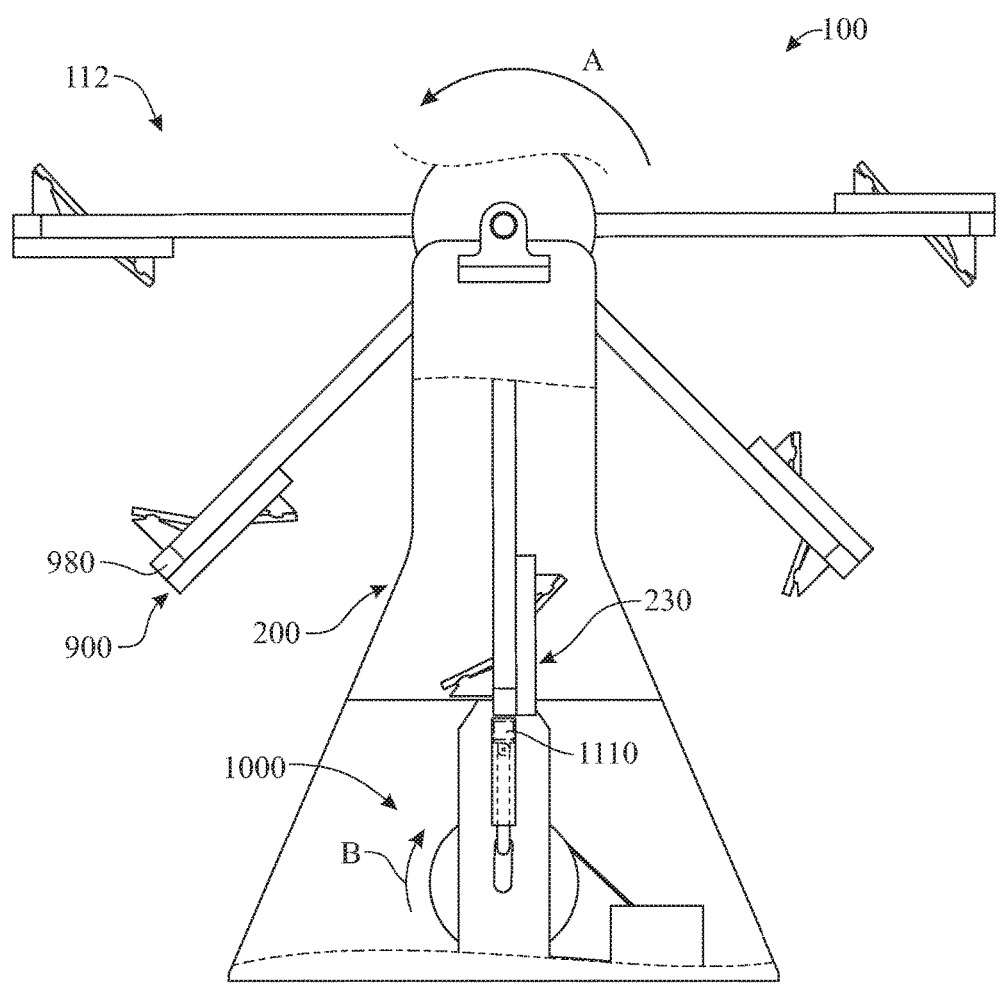
FIG. 8 presents a partial side elevation view, similar to FIG. 7, of the rotational gravitational machine of the present inventions with the bottom magnetic piston approaching an upper or topmost position adjacent the movable magnetic weight assembly.

Referring now to FIGS. 6 and 7, the rotational gravitational machine 100, once properly preset, needs no external power source to initiate rotation of the arm array 112. In order to initiate rotation of the rotational gravitational machine 100 and thus produce a usable torque on the shaft 124, the brake or other immobilizer on the shaft 124 is removed. With the movable magnetic weights in the movable weight assemblies 220, 720 and 920 are in the outermost positions in their respective housings, the arm assemblies 200, 700 and 900 have a relative torque arm length d1. With the movable magnetic weights in the movable weight assemblies 320, 620 and 820 in the radially innermost positions in their respective housings, the arm assemblies 300, 600 and 800 have a relative torque arm length d2 which is less than the torque arm length d1. This difference in weight distributions causes the imbalance in torque arm lengths. Gravity pulls down harder on the arm assemblies 200, 700 and 900 than it does on the arm assemblies 300, 600 and 800 causing the arm array 112 to rotate about the rotation axis x-x thereby rotating the shaft 124 counterclockwise in the direction of arrow A.

With specific reference to FIG. 7, as the arm array 112 rotates counterclockwise, the arm assembly 400 rotates away from the limit switch 1200, the magnetic strip 480 is moved away from the limit switch 1200 causing the limit switch 1200 to return to its normally-open condition. This stops power to flow to the first and second magnetic biasing systems 1000 and 1100.

Eventually, as the next arm assembly (i.e. arm assembly 200) and, in particular, the magnetic strip 280 of arm assembly 200 approaches the limit switch 1200, the limit switch 1200 switches to a closed position. Consequently, power flows to the first and second magnetic biasing systems 1000 and 1100 and the electric motors 1026 and 1126 begin to drive the first and second magnetic pistons 1010 and 1110 upward in the direction of arrow C. Specifically, as shown, the electric motor 1126 drives the belt 1142 to rotate the second pulley 1138, and thus the crank arm 1130, in the direction of arrow B. As the crank arm 1130 rotates it drives the connecting rod 1128 upward to drive the magnetic piston 1110 upward within the hollow housing 1122.

Figure 9:
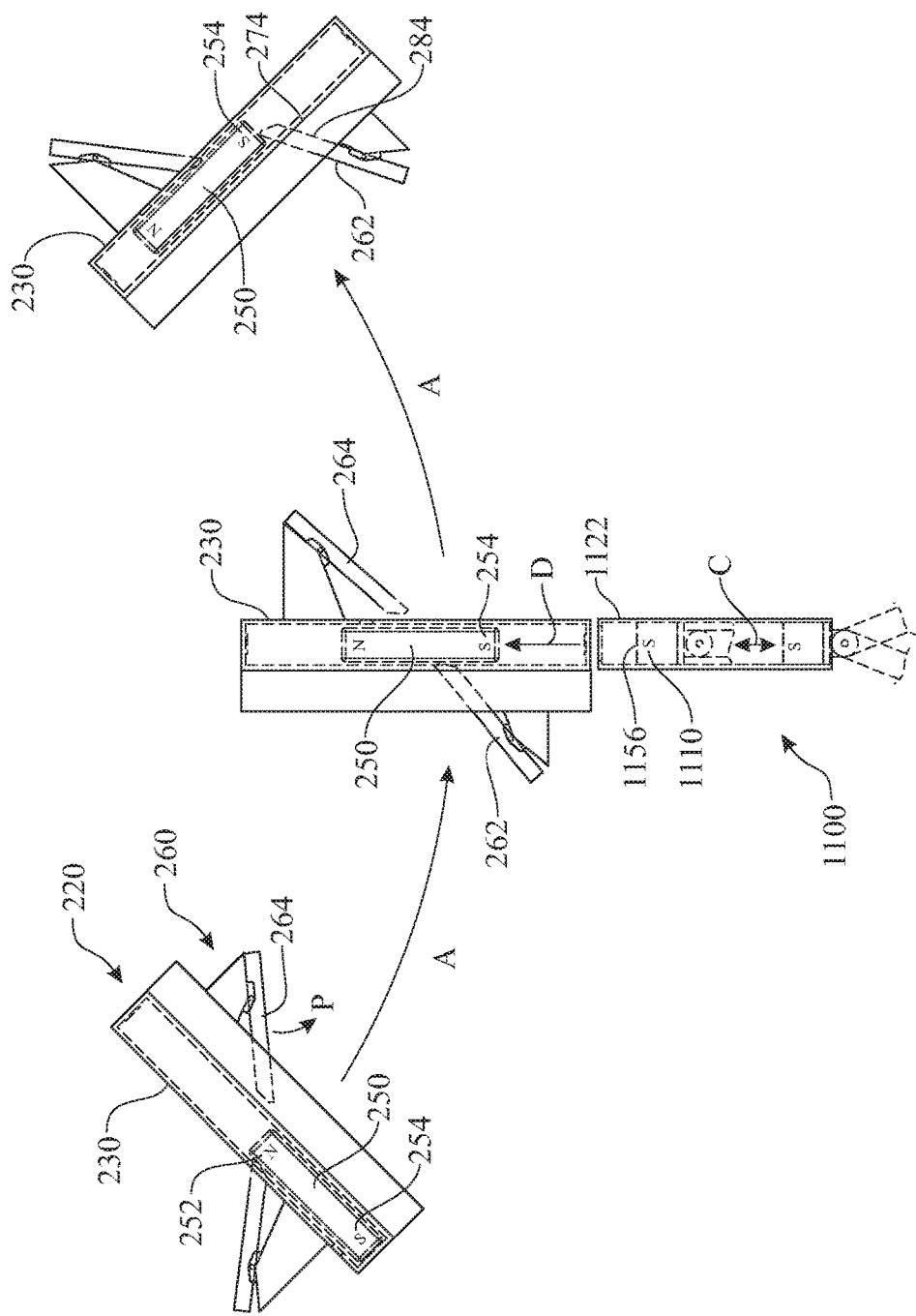
FIG. 9 presents a side elevation view of the movable magnetic weight assembly of the rotational gravitational machine of the present invention as it approaches and passes over the bottom magnetic piston of the rotational gravitational machine of the present invention.

Referring for the moment to FIG. 9, as the first arm assembly 200 approaches the second magnetic biasing system 1100, the movable magnetic weight 250 is in the radially outermost position within the hollow housing 230. As the first arm assembly 200 passes a horizontal position during its rotation, gravity pulls down on the second retainer 264 pulling the second retaining 264 out of engagement with the movable magnetic weight 250. Because the magnetic strip 280 on the first arm assembly 200 is approaching the limit switch 1200, the magnetic piston 1110 continues to move upward and radially inward in the direction of arrow C.

Returning to FIG. 8, along with FIG. 9, as the first arm assembly 200 approaches the bottom dead center "BDC" position in its rotation, the magnetic strip 280 approaches the limit switch 1200. The magnetic piston 1110 continues to move to its uppermost position within the hollow housing 1122. Once the arm assembly 200 has reached its BDC position, the magnetic strip 280 is aligned with the limit switch 1200 continuing to send power to the magnetic biasing systems 1000 and 1100.

As best shown in FIG. 9, as the first arm assembly 200 reaches the BDC position and aligns itself over the second magnetic biasing system 1100, the magnetic piston 1110 is finishing its upward movement within the hollow housing 1122. It should be noted that the magnetic piston 1110 is oriented with a polarized south pole or south pole end 1156 facing upward and radially inward. Thus, as the magnetic piston 1110 finishes rising upward, the south pole end 1156 of the magnetic piston 1110 rapidly drives toward and approaches the movable magnetic weight 250 positioned in its radially outermost position within the movable weight assembly 220. Since opposites attract and common poles repel, the south pole end 1156 of the magnetic piston 1110 rapidly repels the south pole end 254 of the movable magnetic weight 250 driving the movable magnetic weight 250 upward in the direction of arrow D within the hollow housing 230 to its radially innermost position in the hollow housing 250.

As the arm assembly 200 passes the limit switch 1200, the magnetic strip 280 is moved away from the limit switch 1200 still causing it to power to the magnetic biasing systems 1000 and 1100. The magnetic piston 1110 moves back down to its lowest position within the hollow housing 1122 and the cycle is reset for the approach of the next arm assembly 900 to bring the magnetic strip 980 into proximity with the limit switch 1200. The sequence is repeated as all the arm assemblies of the arm array 112 pass the limit switch 1200 (see also FIG. 11).

With continued reference to FIG. 9, as the first arm assembly 200 begins to rotate upward, gravity pulls down on the longer locking section 284 of the first retainer 262 of the braking system 260. This causes the locking section 280 to pass through the oval hole or slot 274 in the hollow housing 230 and engage the south pole end 254 of the movable magnetic weight 250. This "locks" the movable magnetic weight 250 into the radially innermost position within the hollow housing, as shown on the upper right-hand side of FIG. 9. As noted hereinabove, this creates a torque arm of the first arm assembly 200 at a reduced length of d2 (FIG. 6) producing an imbalance with the opposing arm assembly 300 whose movable magnetic weight is being retained at the greater distance of d1. The locking section 284 continues to engage the south pole end 254 of the movable magnetic weight 250 until the first arm assembly 200 passes a horizontal position after which gravity maintains the movable magnetic weight 250 in the radially innermost position and the locking section 284 is pulled back out of engagement with the movable magnetic weight 250 and out of the slot 274 (FIG. 10).

Figure 10:
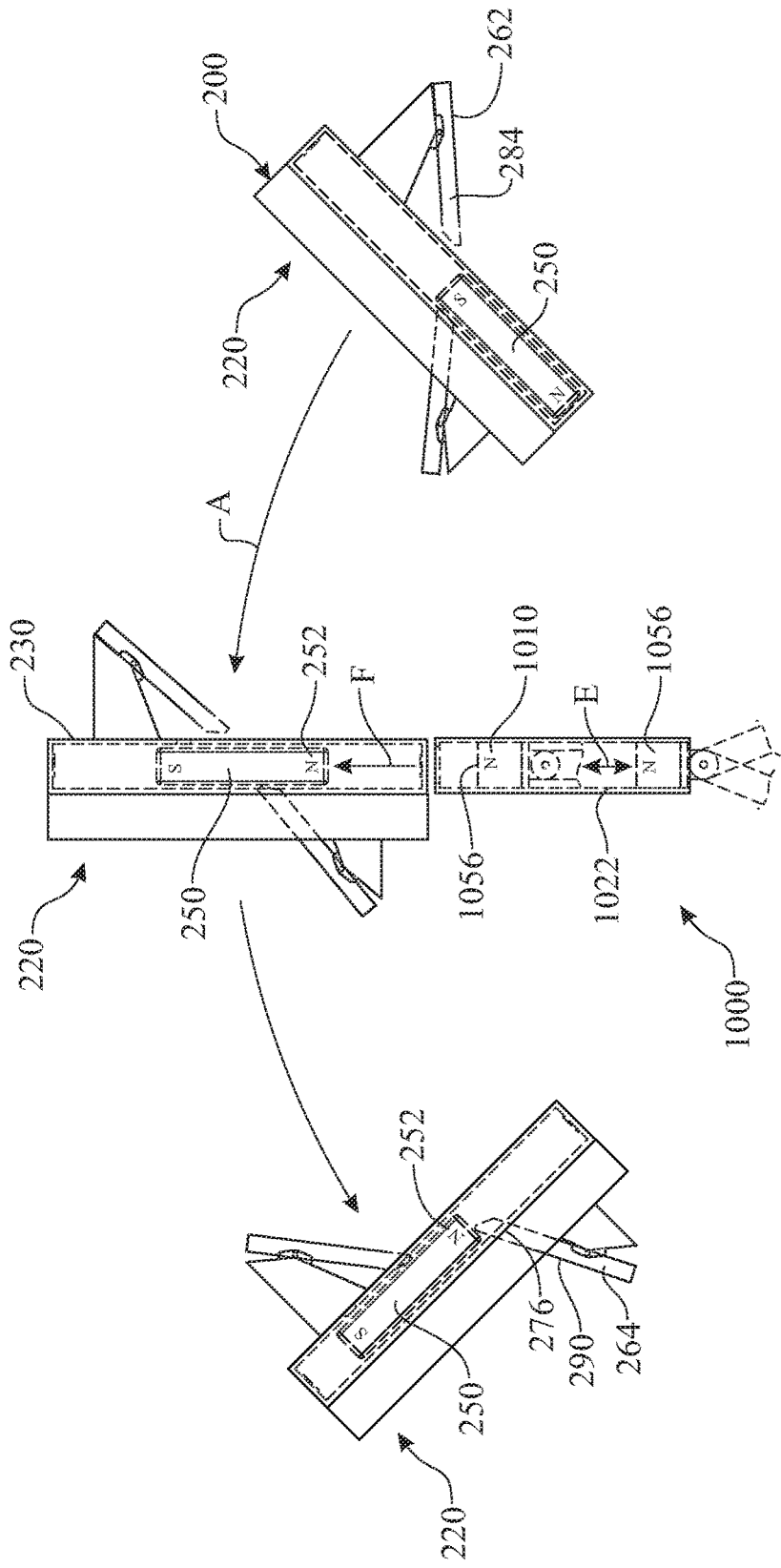
FIG. 10 presents a side elevation view of the movable magnetic weight assembly of the rotational gravitational machine of the present invention as it approaches and passes over a top magnetic piston of the rotational gravitational machine of the present invention.

Turning now to FIG. 10, the first magnetic biasing system 1000 operates simultaneously with the second magnetic biasing system 1100 as a magnetic strip of an arm assembly approaches and passes by the limit switch 1200. Thus, as the opposed arm assembly 300 approaches the limit switch 1200, the first arm assembly 200 approaches the first magnetic biasing system 1000. As shown, the longer locking section 284 of the first retainer 262 falls away from the movable magnetic weight 250 freeing it up for movement radially outward.

The first magnetic biasing system 1000 drives the first magnetic piston 1010 upward in the direction of arrow E within the hollow housing 1022 simultaneously with the upward movement of the second magnetic piston 1110 of the second magnetic biasing system 1100. The first magnetic piston 1010 has a north pole end 1056 facing radially outward such that, as the first movable magnetic weight 250 passes over the first magnetic piston 1010, the north pole end 1056 of the first magnetic piston 1010 rapidly repels the north pole end 252 of the movable magnetic weight 250 causing it to rapidly move in the direction of arrow F to its radially outermost position within the hollow housing 230.

As the first arm assembly 200 rotates in the direction of arrow A away from the first magnetic biasing system, the locking section 290 of the second retainer 264 passes through the slot 276 and engages the north pole end 252 of the movable magnetic weight 250 to hold the movable magnetic weight 250 in its radially outermost position in the hollow housing 230. In the radially outermost position, the movable magnetic weight 250 gives the first arm assembly 200 the longer torque arm length d1 and the pull of gravity on the first movable weight assembly 2000 and, in particular, the movable magnetic weight 250 causes the arm array 112 to rotate in the counter clockwise direction of arrow A.

Figure 11:
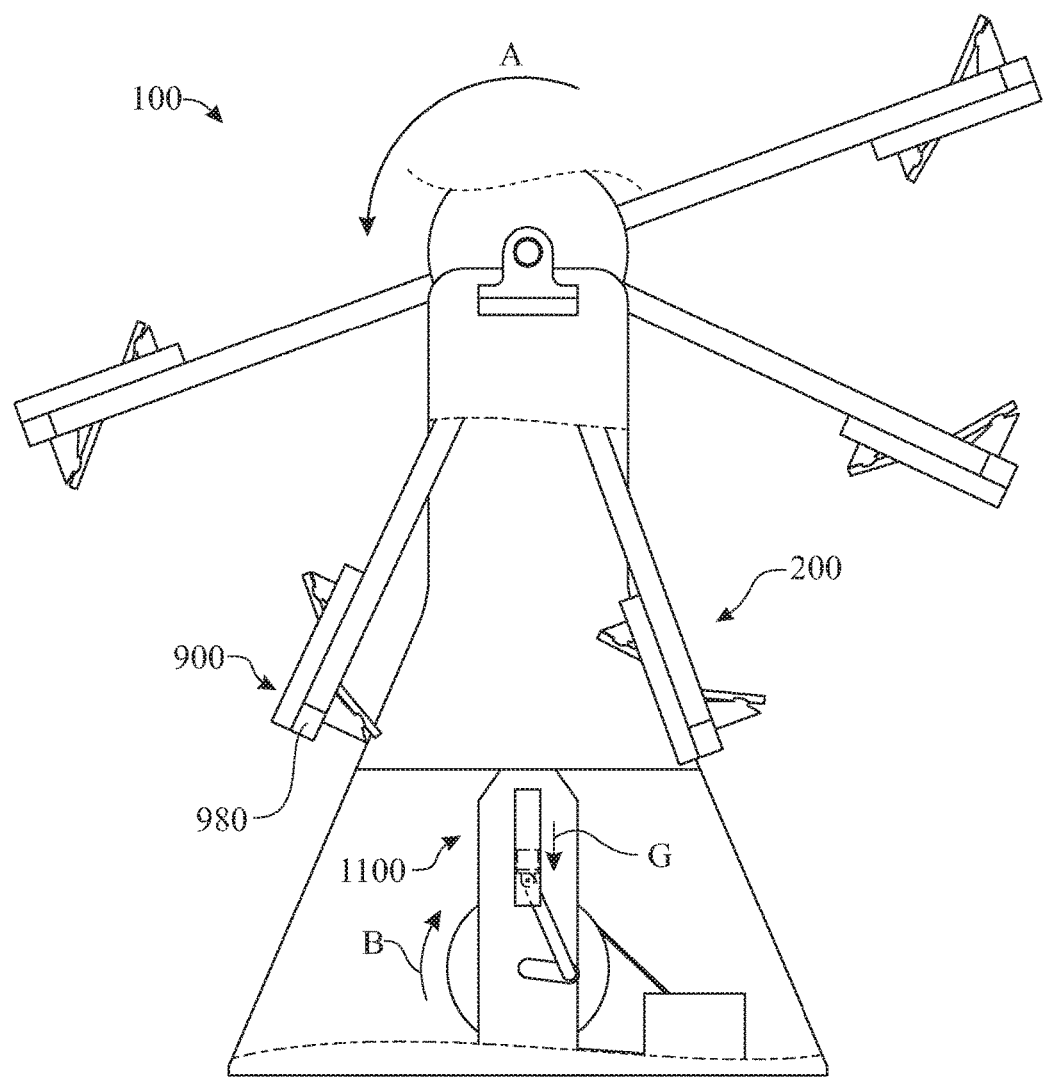
FIG. 11 presents a partial side elevation view, similar to FIG. 8, of the rotational gravitational machine of the present invention with the bottom magnetic piston returning to a lower or bottommost position as a next adjacent movable magnetic weight assembly begins to approach the bottom magnetic piston.

As shown in FIG. 11, and as noted hereinabove, once an arm assembly, for example arm assembly 200, passes the second magnetic biasing system 1100 and thus the limit switch 1200, the power is cut off from the first and second magnetic biasing systems 1000 and 1100 causing the respective magnetic pistons 1010 and 1110 to return to their initial lower positions within their respective hollow housings 1022 and 1122. Thus, the system is ready for the next adjacent arm assembly and its associated magnetic strip to approach the limit switch 1200 and pass over the first and second magnetic biasing systems 1000 and 1100 to continue the rotation of the arm array 112 by misbalancing the arm assemblies with the different torque arm lengths d1 and d2.

It should be noted that once started, the output torque to the shaft 124 is sufficient to drive an electrical generator (not shown) and supply an excess of electrical power beyond that needed to operate the first and second magnetic biasing systems.

Thus, the disclosed rotational gravitational machine 100 can generate an output torque for use in powering an external device, such as, for example an electric generator, with minimal or no further input of energy into the system.

Furthermore, it should be noted that, by having the limit switch 1200 synchronize the operation of the first and second magnetic biasing systems 1000 and 1100 with the instant position of the passing arms, the rotational gravitational machine 100 can provide a useful torque not only during stable or stationary rotating of the arm array 112 but also during acceleration and deceleration of the arm array 112, thereby increasing efficiency.

Figure 12:
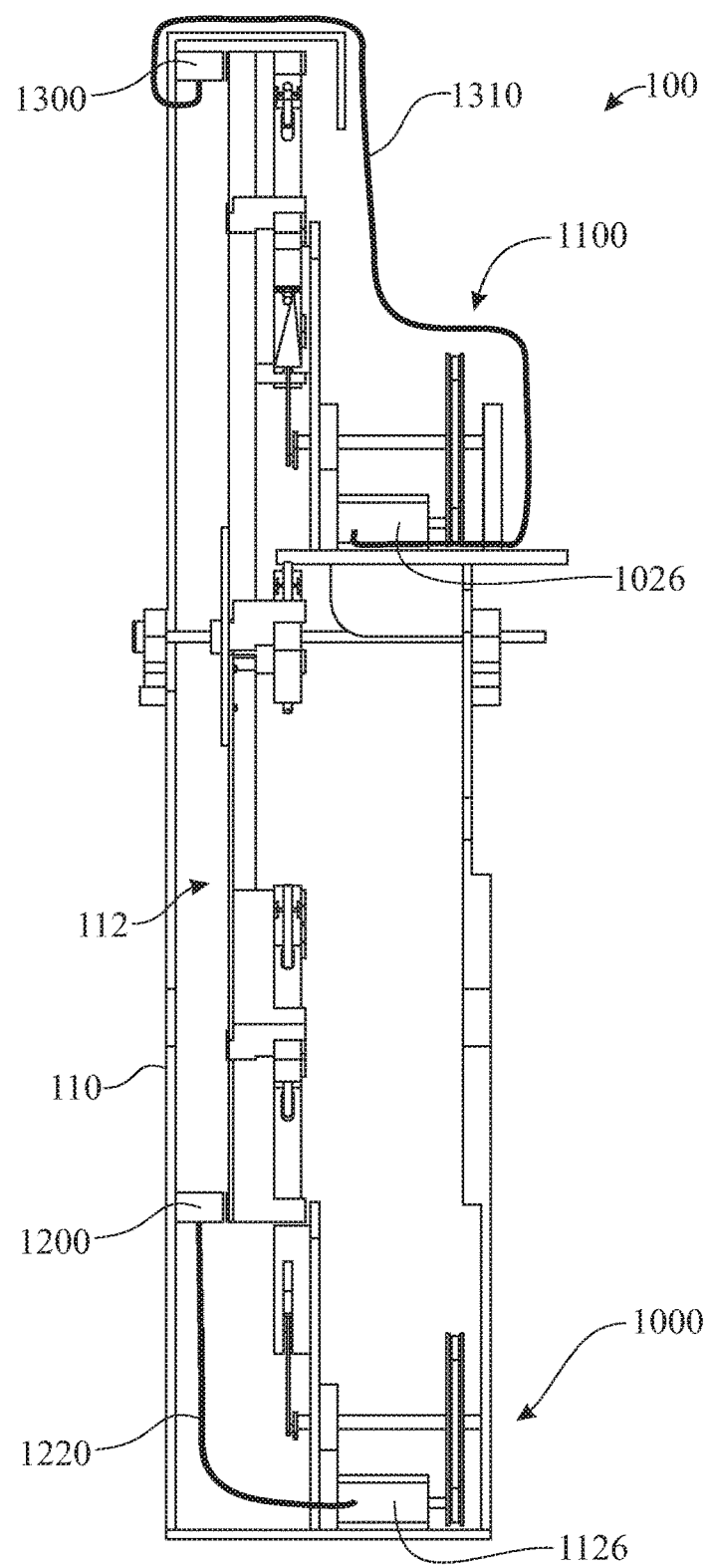
FIG. 12 presents an end view of a second, alternative embodiment of a rotational gravitational machine of the present invention incorporating two limit or sensor switches for controlling top and bottom magnetic pistons.

Turning now for the moment to FIG. 12, in an alternative embodiment, a second limit switch 1300 may be provided to independently operate the first magnetic biasing system 1000. This may be particularly useful in those embodiments of the disclosed rotational gravity system 100 that incorporate an uneven number of arm assemblies or those embodiments where the arm assemblies are not symmetrical and may have movable magnetic weights of differing weight to compensate for the asymmetry.

The second limit switch 1300 is connected to the first electric motor 1026 by a wire 1310. In this embodiment, the first wire 1210 (FIG. 3) connecting the limit switch 1200 to the first electric motor 1026 is eliminated. In all other respects, the rotational gravitational machine 100 can function identically to that described hereinabove.

Further alternative embodiments are contemplated without departing from the scope of the disclosure. For instance, the structure and particular construction of the frame may vary. It is also contemplated that the number of motors, limit switches and arm assemblies may vary. It is further contemplated that one or more flywheels may be provided to increase the torque delivered by the machine.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A rotational gravitational machine, comprising:
   a rotatable structure, configured to rotate about a rotation axis;
   a plurality of movable weight assemblies carried by and jointly rotatable with the rotatable structure about the rotation axis, wherein the movable weight assemblies are arranged radially spaced apart from the rotation axis and angularly spaced apart from each other, wherein each movable weight assembly comprises a movable magnetic weight configured for reciprocal radial translation between a radially innermost position relative to said rotation axis and a radially outermost position relative to said rotation axis; and a first magnetic biasing system including a radially movable, first magnetic piston configured to bias said movable magnetic weight between the radially innermost position and the radially outermost position.

2. The rotational gravitational machine of claim 1, wherein said first magnetic biasing system includes a first electric motor configured to radially move said first magnetic piston.

3. The rotational gravitational machine of claim 1, further comprising at least one proximity switch configured to detect the presence of one weight assembly of the plurality of weight assemblies and responsively supply power to the first magnetic biasing system to bias the movable magnetic weight between the radially innermost position and the radially outermost position.

4. The rotational gravitational machine of claim 1, further comprising a second magnetic biasing system including a radially movable, second magnetic piston configured to bias said movable magnetic weight between the radially outermost position and the radially innermost position.

5. The rotational gravitational machine of claim 4, wherein the second magnetic biasing system includes a second electric motor configured to radially move said second magnetic piston.

6. The rotational gravitational machine of claim 4, further comprising at least one proximity switch configured to detect the presence of one weight assembly of the plurality of weight assemblies and responsively supply power to the second magnetic biasing system to bias the movable magnetic weight between the radially innermost position and the radially outermost position.

7. The rotational gravitational machine of claim 1, wherein the rotatable structure comprises an arm array including a plurality of arm assemblies extending radially outward of the rotation axis and angularly spaced-apart with one another, wherein each movable weight assembly of the plurality of movable weight assemblies is carried by a respective arm assembly of the plurality of arm assemblies.

8. The rotational gravitational machine of claim 7, further comprising a central hub assembly defining the central rotation axis, wherein the arm assemblies extend radially outward of the central hub.

9. The rotational gravitational machine of claim 1, wherein the plurality of movable weight assemblies is rotatable through a top dead center position, and further wherein said first magnetic biasing system is located adjacent to said top dead center position and is configured to move the movable magnetic weight radially outward.

10. The rotational gravitational machine of claim 9, further comprising a second magnetic biasing system including a radially movable, second magnetic piston configured to bias said movable magnetic weight between the radially outermost position and the radially innermost position, and further wherein the plurality of movable weight assemblies is rotatable through a bottom dead center position and said second magnetic biasing system is located adjacent to said bottom dead center position and is configured to move the movable magnetic weight radially inward.

11. The rotational gravitational machine of claim 1, wherein the plurality of movable weight assemblies is rotatable through a bottom dead center position, and further wherein said first magnetic biasing system is located adjacent to said bottom dead center position and is configured to move the movable magnetic weight radially inward.

12. The rotational gravitational machine of claim 11, further comprising a second magnetic biasing system including a radially movable, second magnetic piston configured to bias said movable magnetic weight between the radially outermost position and the radially innermost position, and further wherein the plurality of movable weight assemblies is rotatable through a top dead center position and said second magnetic biasing system is located adjacent to said top dead center position and is configured to move the movable magnetic weight radially outward.

13. A rotational gravitational machine, comprising:
a rotatable structure, configured to rotate about a rotation axis;
a plurality of movable weight assemblies carried by and jointly rotatable with the rotatable structure about the rotation axis, wherein the movable weight assemblies are arranged radially spaced apart from the rotation axis and angularly spaced apart from each other, wherein each movable weight assembly comprises a movable magnetic weight configured for reciprocal radial translation between a radially innermost position relative to said rotation axis and a radially outermost position relative to said rotation axis;
a first magnetic biasing system including a first electric motor and a first magnetic piston, wherein the first magnetic piston is radially movable by the first electric motor and configured to bias said movable magnetic weight in a direction from the radially innermost position towards the radially outermost position; and
a second magnetic biasing system including a second electric motor and a second magnetic piston, wherein the second magnetic piston is radially movable by the second electric motor and configured to bias said movable magnetic weight in a direction from the radially outermost position towards the radially innermost position.

14. The rotational gravitational machine of claim 13, wherein the plurality of movable weight assemblies is rotatable through a top dead center position, and further wherein said first magnetic biasing system is located adjacent to said top dead center position.

15. The rotational gravitational machine of claim 13, wherein the plurality of movable weight assemblies is rotatable through a bottom dead center position, and further wherein said second magnetic biasing system is located adjacent to said bottom dead center position.

16. The rotational gravitational machine of claim 13, wherein each movable weight assembly includes a hollow housing inside which the movable magnetic weight is freely slidably housed such that said movable magnetic weight is movable between the radially innermost position relative and the radially outermost position.

17. The rotational gravitational machine of claim 16, wherein each movable weight assembly further comprises a braking system associated with the hollow housing, wherein the braking system is configured to maintain the movable magnetic weight in the radially outermost position as the movable weight assembly rotates downward.

18. The rotational gravitational machine of claim 16, wherein each movable weight assembly further comprises a braking system associated with the hollow housing, wherein the braking system is configured to maintain the movable magnetic weight in the radially innermost position as the movable weight assembly rotates upward.

19. A rotational gravitational machine, comprising:
a rotatable structure, configured to rotate about a rotation axis;
a plurality of movable weight assemblies carried by and jointly rotatable with the rotatable structure about the rotation axis, wherein the movable weight assemblies are arranged radially spaced apart from the rotation axis and angularly spaced apart from each other, wherein each movable weight assembly comprises:
- a hollow housing,
- a movable magnetic weight freely slidably housed within the hollow housing and configured for reciprocal radial translation between a radially innermost position relative to said rotation axis and a radially outermost position relative to said rotation axis, and
- a braking system associated with the hollow housing, wherein the braking system is configured to maintain the movable magnetic weight in the radially outermost position as the movable weight assembly rotates downward and to maintain the movable magnetic weight in the radially innermost position as the movable weight assembly rotates upward;

a first magnetic biasing system including a first electric motor and a first magnetic piston, wherein the first magnetic piston is radially movable by the first electric motor and configured to bias said movable magnetic weight in a direction from the radially innermost position towards the radially outermost position; and a second magnetic biasing system including a second electric motor and a second magnetic piston, wherein the second magnetic piston is radially movable by the second electric motor and configured to bias said movable magnetic weight in a direction from the radially outermost position towards the radially innermost position.

20. The rotational gravitational machine of claim 19, wherein the braking system includes a first retainer for maintaining the movable magnetic weight in the radially innermost position and a second retainer for maintaining the movable magnetic weight in the radially outermost position, wherein each one of the first and second retainers is pivotally mounted on said hollow housing about a respective pivot pin and includes a first portion and a second portion extending from the pivot pin, wherein the second portion is heavier than the first portion, and further wherein each retainer is pivotable due to gravity to a position in which the second portion blocks radial translation of the movable magnetic weight within the hollow housing.

\* \* \* \* \*